United States Patent
Birch et al.

(10) Patent No.: US 12,346,395 B2
(45) Date of Patent: *Jul. 1, 2025

(54) BROWSER-BASED NAVIGATION SUGGESTIONS FOR TASK COMPLETION

(71) Applicant: Google LLC, Mountain View, CA (US)

(72) Inventors: Samuel Birch, Seattle, WA (US); Rishi Agarwal, Kirkland, WA (US); Yusuf Ozuysal, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/449,397

(22) Filed: Aug. 14, 2023

(65) Prior Publication Data

US 2023/0385356 A1 Nov. 30, 2023

Related U.S. Application Data

(63) Continuation of application No. 17/447,245, filed on Sep. 9, 2021, now Pat. No. 11,727,076, which is a
(Continued)

(51) Int. Cl.
*G06F 40/00* (2020.01)
*G06F 16/9535* (2019.01)
(Continued)

(52) U.S. Cl.
CPC ........ *G06F 16/954* (2019.01); *G06F 16/9535* (2019.01); *G06F 16/9574* (2019.01);
(Continued)

(58) Field of Classification Search
CPC ... G06F 16/9535; G06F 16/954; G06F 40/134
See application file for complete search history.

(56) References Cited

U.S. PATENT DOCUMENTS

| | | | |
|---|---|---|---|
| 7,296,016 | B1 | 11/2007 | Farach-Colton et al. |
| 7,827,170 | B1 | 11/2010 | Horling et al. |

(Continued)

FOREIGN PATENT DOCUMENTS

| | | |
|---|---|---|
| CN | 103955529 A | 7/2014 |
| WO | 2017001946 A1 | 1/2017 |
| WO | 2017076200 A1 | 5/2017 |

OTHER PUBLICATIONS

Ganesha et al., Intuitive content rendering by intelligently organizing browser tabs for enhanced user experience and better screen space utilization Smart Tabs, 2015 IEEE International Advance Computing Conference, Bangalore, India, pp. 1030-1034, doi: 10.1109/IADCC.2015.7154861 (Year: 2015).*

(Continued)

*Primary Examiner* — Barbara M Level
(74) *Attorney, Agent, or Firm* — Brake Hughes Bellermann LLP

(57) ABSTRACT

In some implementations, a method includes acquiring data about a plurality of web pages rendered within one or more browser tabs of a web browser executing on at least one computing device and processing the acquired data to group the plurality of web pages into one or more groups of web pages. The processing includes performing a similarity analysis using the acquired data, where each group includes web pages that are determined to be topically related to each other based on the similarity analysis. The method includes selecting a group of web pages from the one or more groups of web pages that are determined to be topically-related to content displayed in the web browser and providing a navigation suggestion for display on a user interface of the web browser based on the selected group.

16 Claims, 24 Drawing Sheets

Related U.S. Application Data continuation of application No. 16/520,920, filed on Jul. 24, 2019, now Pat. No. 11,138,286.

(60) Provisional application No. 62/712,526, filed on Jul. 31, 2018.

(51) Int. Cl.
*G06F 16/954* (2019.01)
*G06F 16/957* (2019.01)
*G06F 18/2115* (2023.01)
*G06F 18/231* (2023.01)
*G06F 40/134* (2020.01)

(52) U.S. Cl.
CPC ........ *G06F 18/2115* (2023.01); *G06F 18/231* (2023.01); *G06F 40/134* (2020.01)

(56) References Cited

U.S. PATENT DOCUMENTS

| | | | |
|---|---|---|---|
| 7,953,730 | B1 | 5/2011 | Bleckner et al. |
| 8,078,607 | B2 | 12/2011 | Oztekin et al. |
| 8,131,731 | B2 | 3/2012 | Vaughan et al. |
| 8,229,911 | B2 | 7/2012 | Bennett |
| 8,600,967 | B2 | 12/2013 | Jin et al. |
| 8,688,706 | B2 | 4/2014 | Liebald et al. |
| 8,935,245 | B1 | 1/2015 | Cionca et al. |
| 9,069,825 | B1 | 6/2015 | Chang |
| 9,323,846 | B2 | 4/2016 | Jeh et al. |
| 9,600,531 | B1 | 3/2017 | Rakowski et al. |
| 9,767,200 | B1 | 9/2017 | Chang |
| 10,387,546 | B1 * | 8/2019 | Duran ................... G06F 40/14 |
| 11,138,286 | B2 | 10/2021 | Birch et al. |
| 11,372,945 | B2 * | 6/2022 | Horiuchi ............... G06F 16/957 |
| 2006/0224583 | A1 | 10/2006 | Fikes et al. |
| 2007/0011616 | A1 | 1/2007 | Ording et al. |
| 2007/0073641 | A1 | 3/2007 | Perry et al. |
| 2007/0255754 | A1 | 11/2007 | Gheel |
| 2008/0022229 | A1 | 1/2008 | Bhumkar et al. |
| 2010/0070928 | A1 | 3/2010 | Goodger et al. |
| 2010/0082649 | A1 | 4/2010 | Gutt et al. |
| 2011/0035345 | A1 | 2/2011 | Duan et al. |
| 2011/0035402 | A1 | 2/2011 | Agrawal et al. |
| 2011/0191344 | A1 | 8/2011 | Jin et al. |
| 2011/0252329 | A1 | 10/2011 | Broman |
| 2011/0289068 | A1 | 11/2011 | Teevan et al. |
| 2012/0053927 | A1 | 3/2012 | Kulkarni et al. |
| 2013/0117675 | A1 | 5/2013 | Twig et al. |
| 2013/0254685 | A1 | 9/2013 | Batraski et al. |
| 2013/0297590 | A1 | 11/2013 | Zukovsky et al. |
| 2014/0026037 | A1 * | 1/2014 | Garb ................... G06F 16/972 715/255 |
| 2014/0164960 | A1 * | 6/2014 | Kuo ..................... G06F 3/0486 715/760 |
| 2014/0279793 | A1 | 9/2014 | Wohlstadter |
| 2014/0344660 | A1 | 11/2014 | Hayden |
| 2014/0359489 | A1 | 12/2014 | Zhao et al. |
| 2015/0205462 | A1 * | 7/2015 | Jitkoff ................... G06F 16/955 715/777 |
| 2015/0324434 | A1 | 11/2015 | Greenwood et al. |
| 2016/0085428 | A1 * | 3/2016 | Ashby ................... G06F 16/958 715/738 |
| 2016/0164984 | A1 | 6/2016 | Chuchro et al. |
| 2017/0199638 | A1 | 7/2017 | Bhupatiraju et al. |
| 2017/0293419 | A1 * | 10/2017 | Dipin .................... G06F 16/957 |
| 2018/0113583 | A1 * | 4/2018 | Jain ....................... G06F 3/0483 |
| 2018/0307768 | A1 * | 10/2018 | Hu .......................... G06F 40/30 |
| 2020/0104403 | A1 | 4/2020 | Agarwal |
| 2022/0092133 | A1 * | 3/2022 | Devereux ............. G06F 3/0482 |
| 2023/0214094 | A1 * | 7/2023 | Yushkina ............. G06F 3/0483 715/764 |

OTHER PUBLICATIONS

K. P. Dipin, J. Bose and S. Pal, "User Friendly Tab Management in Web Browsers," 2019 16th IEEE Annual Consumer Communications & Networking Conference (CCNC), Las Vegas, NV, USA, 2019, pp. 1-4, doi: 10.1109/CCNC.2019.8651881 (Year: 2019).*
S. K. Sathish, A. A. Patankar and N. Neema, "Semantics-Based Browsing Using Latent Topic Warped Indexes, " 2016 IEEE Tenth International Conference on Semantic Computing (ICSC), Laguna Hills, CA, USA, 2016, pp. 378-381, doi: 10.1109/ICSC.2016.15. (Year: 2016).*
Communication pursuant to Article 94(3) EPC for European Application No. 19753221.1, mailed May 20, 2020, 7 pages.
Communication under Rule 71(3) EPC for European Application No. 19753221.1, mailed Feb. 10, 2023, 77 pages.
International Search Report and Written Opinion for Application No. PCT/US2019/043356, mailed on Sep. 10, 2019, 13 pages.
Gao, et al., "Chrome is experimenting with a 'Switch to this tab' button", AndroidPolice, https://www.androidpolice.com/2018/07/24/chrome-experimenting-switch-tab-button, Jul. 24, 2018, 2 pages.
Wahab, "How to View More Suggestion in the Chrome Address Bar", XP055892453, retrieved on Feb. 16, 2022 from https://www.addictivetips.com/web/viewmore-suggestion-in-chrome-address-bar, Feb. 1, 2018, 2 pages.
U.S. Appl. No. 16/520,920, filed Jul. 24, 2019, Issued.
U.S. Appl. No. 17/447,245, filed Sep. 9, 2021, Allowed.
Extended European Search Report for European Application No. 23189320.7, mailed Nov. 9, 2023, 9 pages.
"Explaining Android: "Enabling Chrome's Accessibility Tab Switcher"", retrieved from https://www.youtube.com/watch?v=ANqtQ8WAE3M, Sep. 21, 2017, XP093097118, 4 pages.
Notice of Allowance with English translation for Chinese Application No. 201980002977.8, mailed Dec. 13, 2024, 6 pages.

* cited by examiner

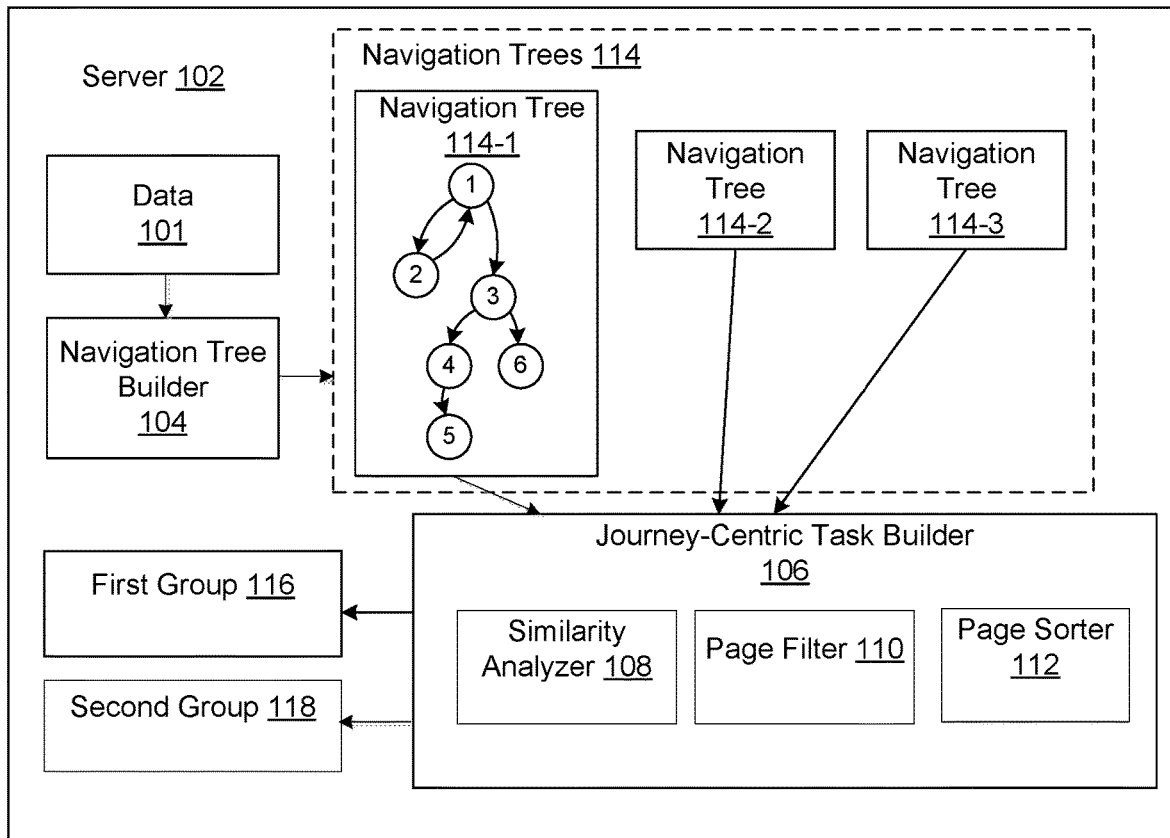
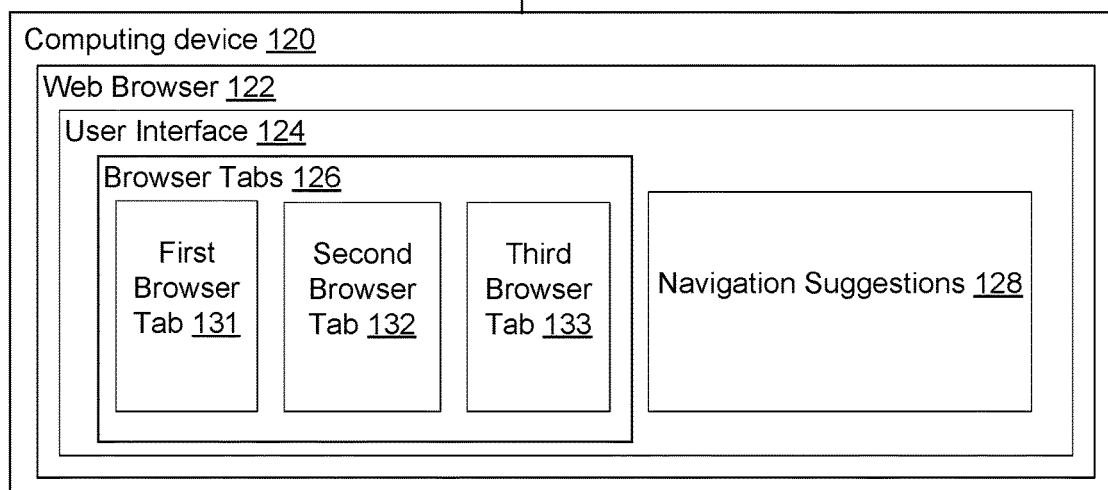
FIG. 1A

114

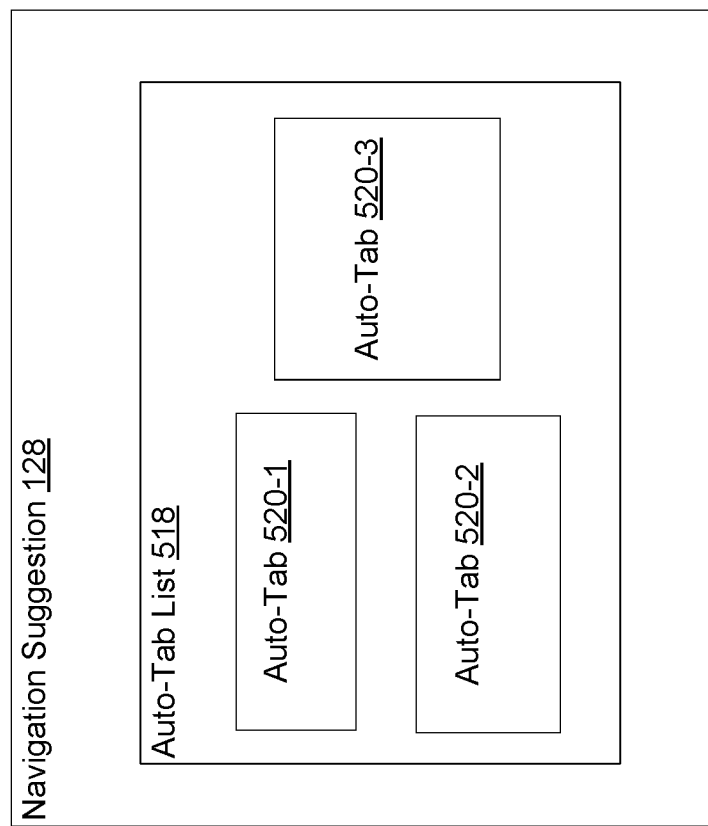

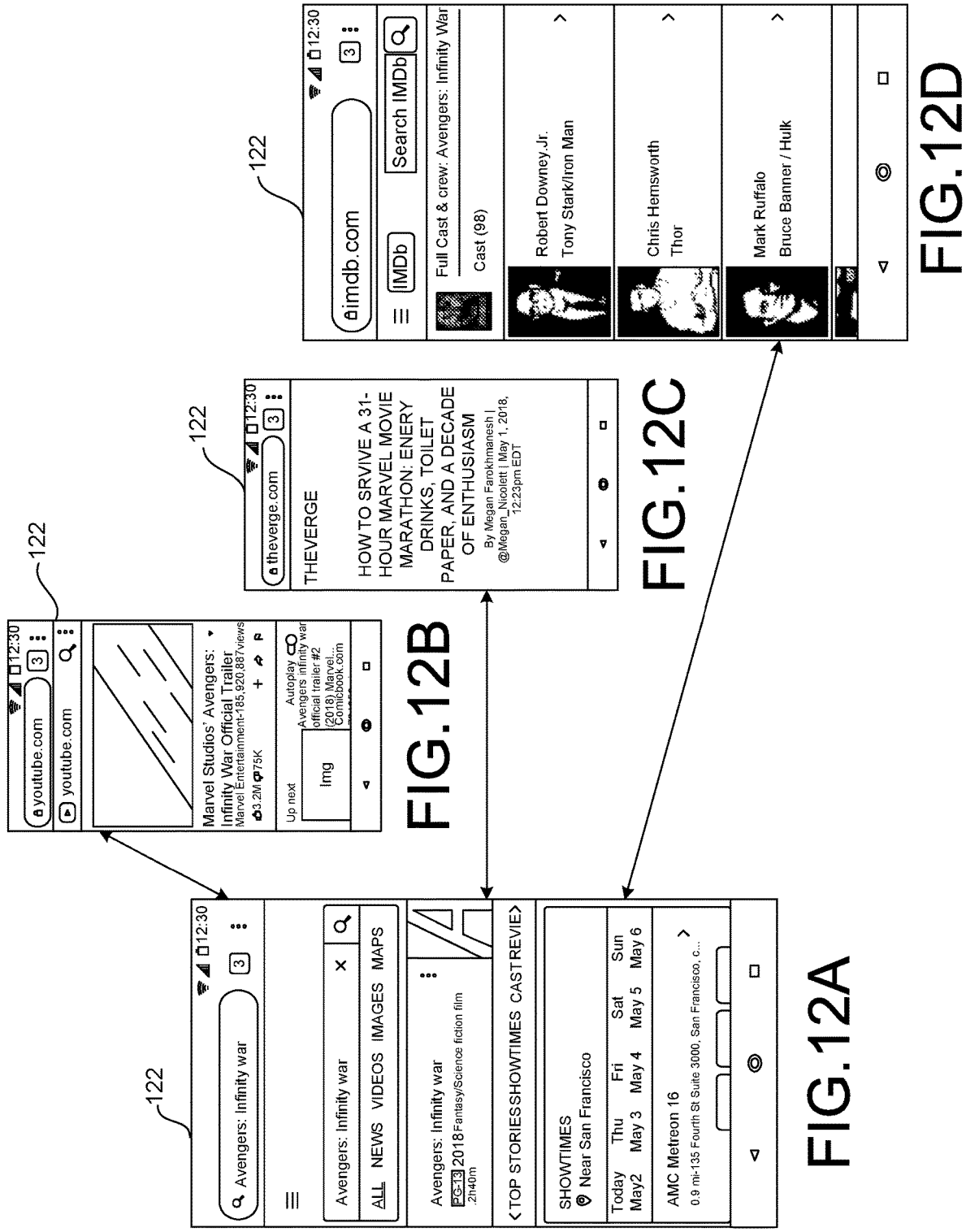

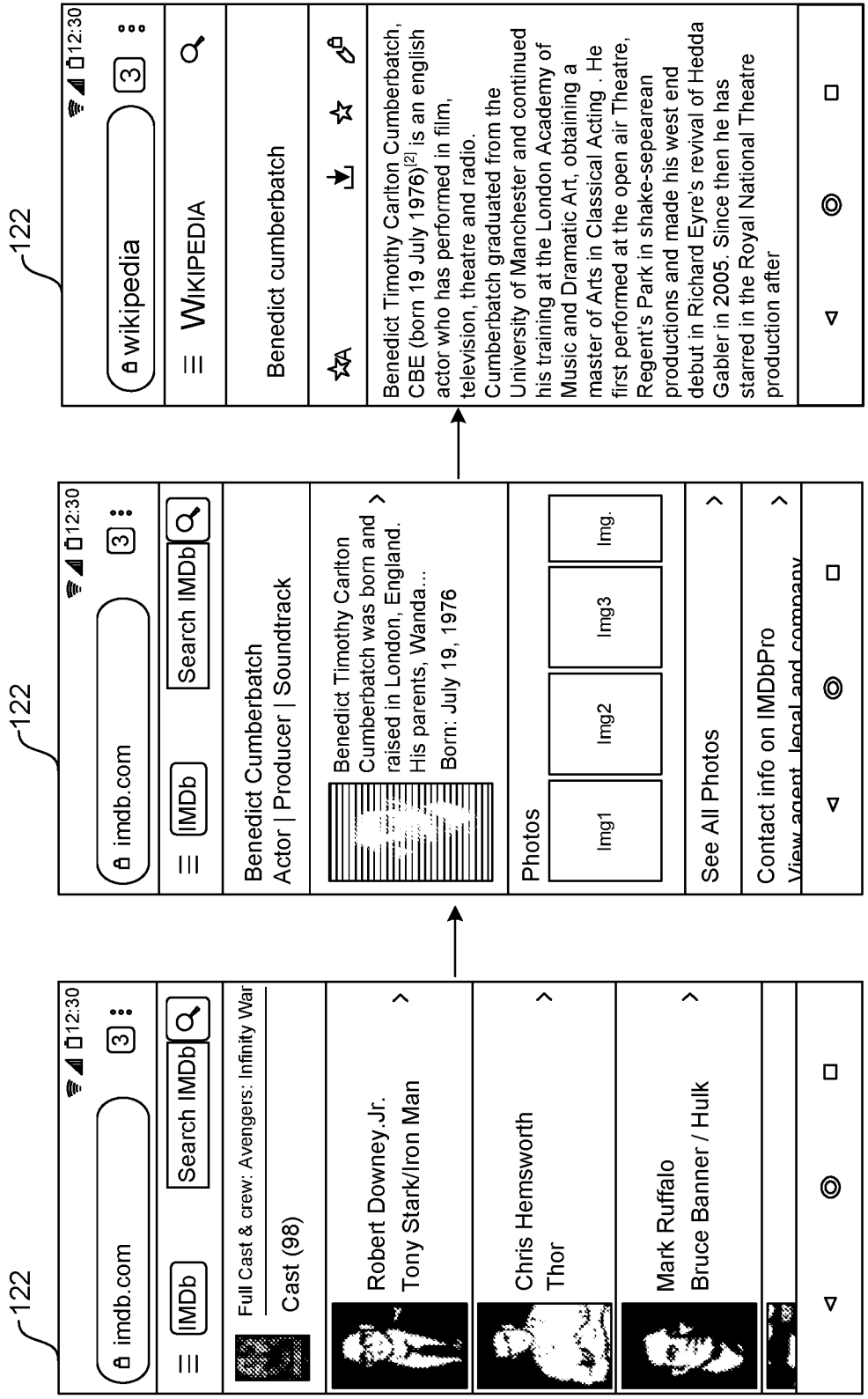

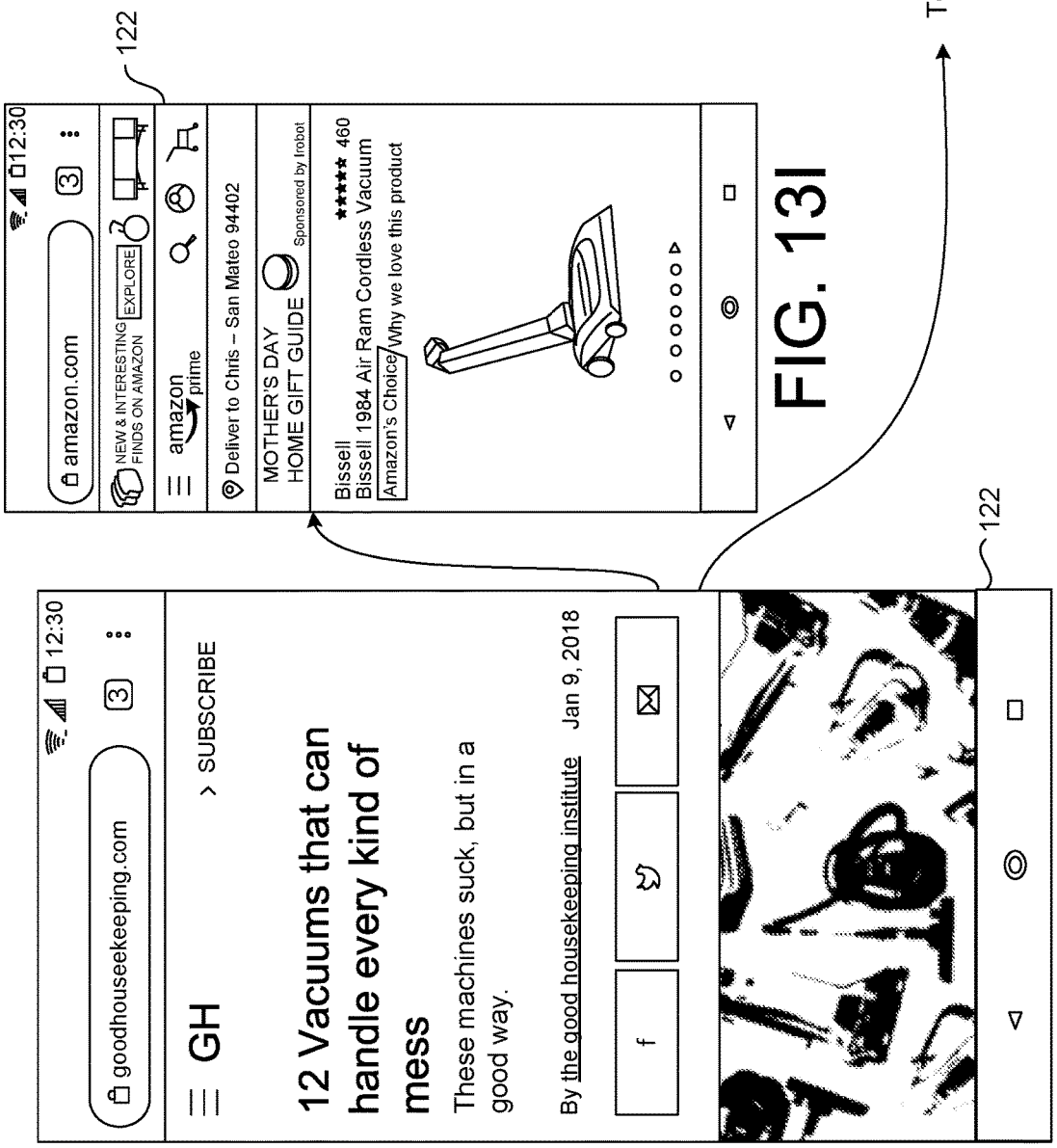

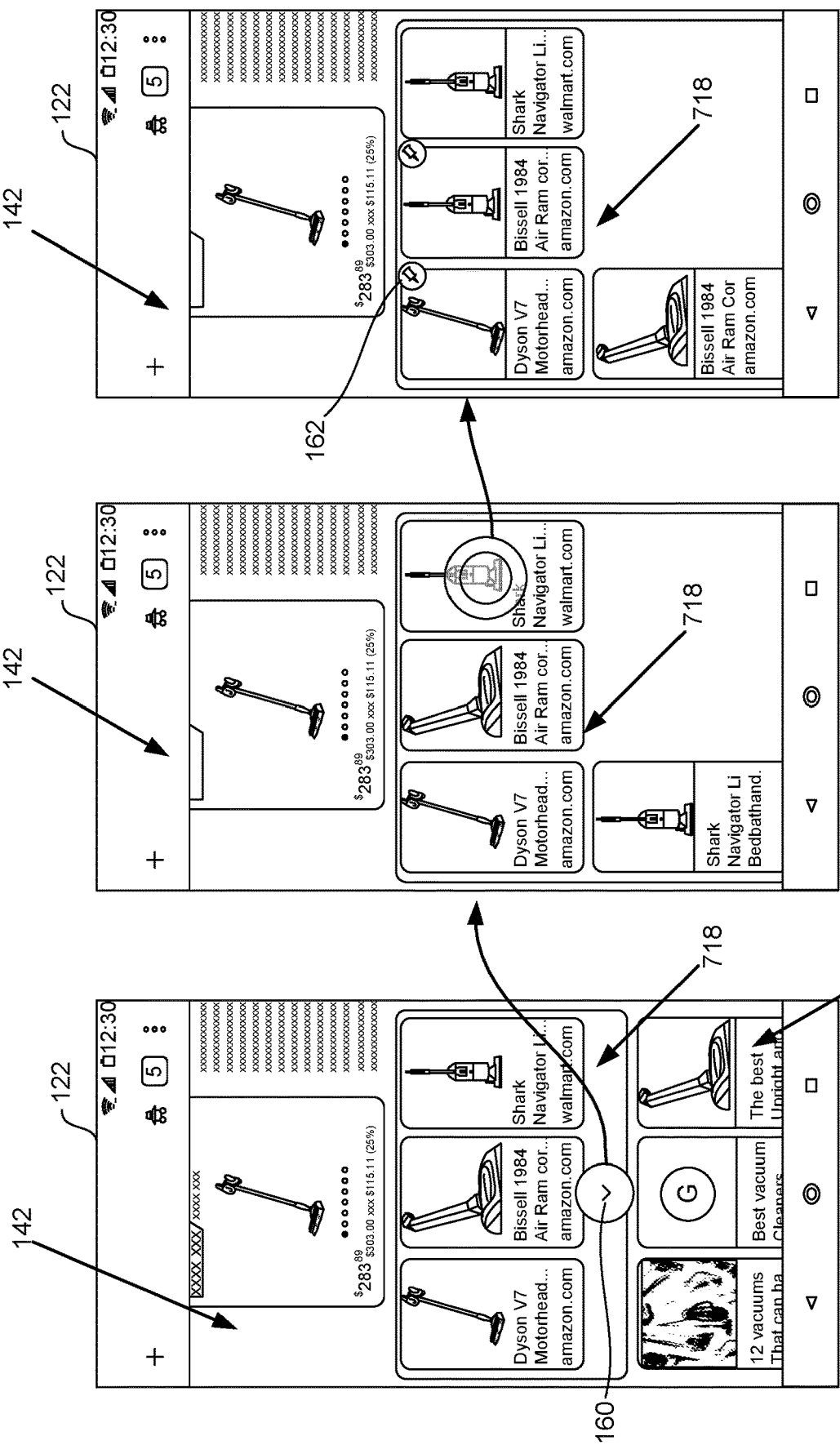

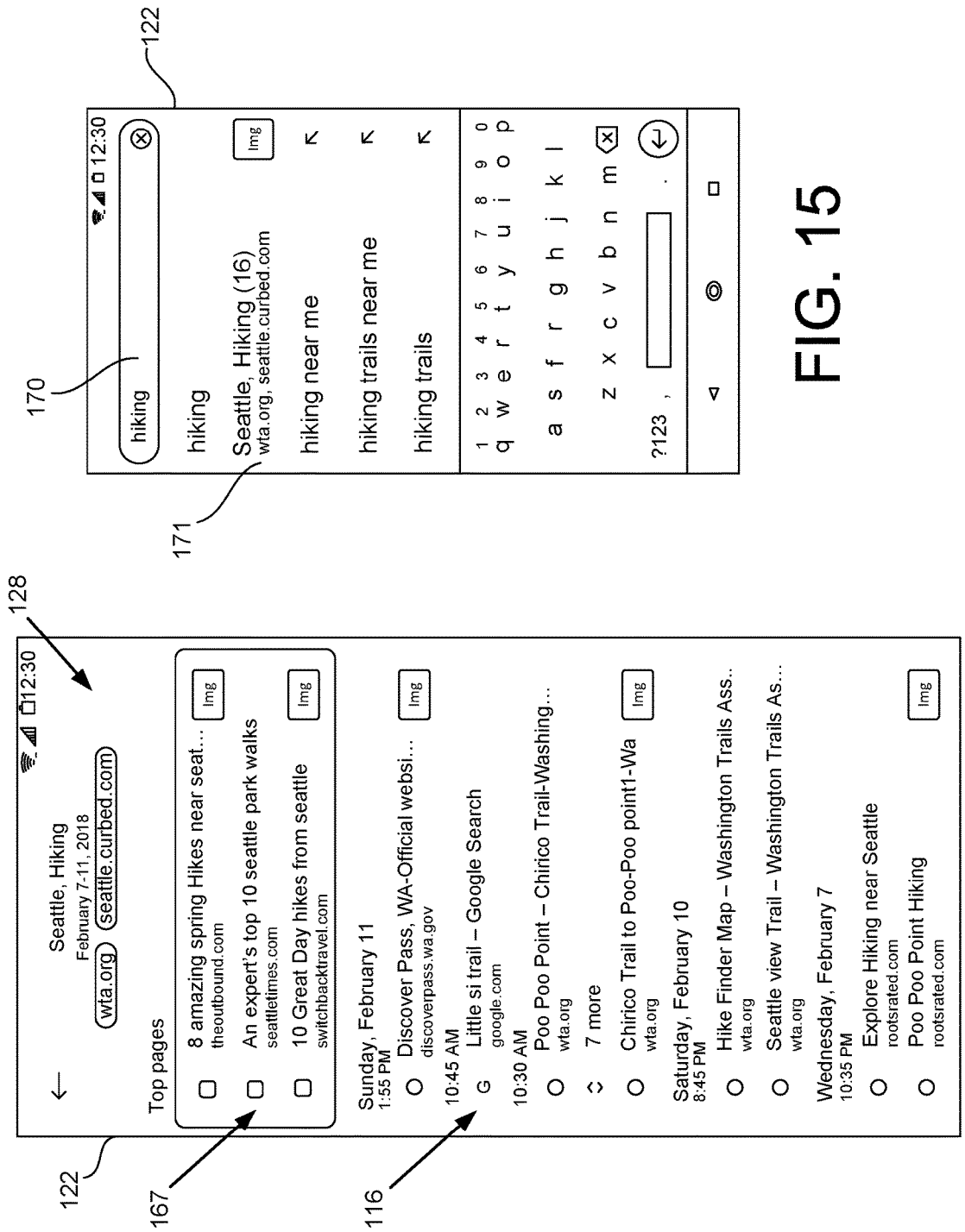

BROWSER-BASED NAVIGATION SUGGESTIONS FOR TASK COMPLETION

CROSS-REFERENCE TO RELATED APPLICATIONS

This application is a continuation of, and claims priority to, U.S. patent application Ser. No. 17/447,245, filed on Sep. 9, 2021, entitled "BROWSER-BASED NAVIGATION SUGGESTIONS FOR TASK COMPLETION", now U.S. Pat. No. 11,727,076, which is a continuation of U.S. patent application Ser. No. 16/520,920, filed on Jul. 24, 2019, entitled "BROWSER-BASED NAVIGATION SUGGESTIONS FOR TASK COMPLETION", now U.S. Pat. No. 11,138,286, which claims priority to U.S. Patent Application No. 62/712,526, filed on Jul. 31, 2018, entitled "BROWSER-BASED NAVIGATION SUGGESTIONS FOR TASK COMPLETION", the disclosures of which are incorporated by reference herein in their entirety.

BACKGROUND

Browser tabs of a web browser may be a useful tool for obtaining and rendering content from the Internet in order to carry out a specific task of a user (e.g., planning a camping trip, deciding and purchasing a new vacuum cleaner, etc.).

SUMMARY

In some implementations, a method includes acquiring data about a plurality of web pages rendered within one or more browser tabs of a web browser executing on at least one computing device and processing the acquired data to group the plurality of web pages into one or more groups of web pages, where each group includes a respective subset of the plurality of web pages. The processing includes performing a similarity analysis using the acquired data, where each group includes web pages that are determined to be topically related to each other based on the similarity analysis. The method includes selecting a group of web pages from the one or more groups of web pages that are determined to be topically-related to content displayed in the web browser, where the selected group represents a task being carried out by a user of the web browser, and providing a navigation suggestion for display on a user interface of the web browser based on the selected group, where the navigation suggestion includes one or more user-selectable elements that assist the user to complete the task.

In some implementations, the method may include one or more of the following features (or any combination thereof). The plurality of web pages includes a first web page rendered by the web browser executing on a first device, and a second web page rendered by the web browser executing on a second device. The providing the navigation suggestion includes displaying content of one or more web pages of the selected group on the user interface of the web browser. The providing the navigation suggestion includes displaying content of a web page not previously rendered by the web browser during a course of executing the task by the user. The processing further includes generating a plurality of navigation trees based on the acquired data, clustering a subset of the plurality of navigation trees into a cluster group based on the similarity analysis, and identifying the group of web pages based on the cluster group. A navigation tree of the plurality of navigation trees includes nodes and links between the nodes, where the nodes represent web pages rendered by the web browser, and the links represent navigation paths between the web pages. The processing further includes filtering the group of web pages to remove one or more web pages from the group based on determined values for one or more user engagement metrics, where each determined value of a user engagement metric indicates an amount of user engagement with a respective web page of the group. The processing further includes sorting the group of web pages based on determined values of one or more user engagement metrics, where each determined value of a user engagement metric indicates an amount of user engagement with a respective web page of the group. The providing the navigation suggestion includes providing a selection to the selected group of web pages in a bookmark section of the web browser. The providing the navigation suggestion includes providing a selection to the selected group of web pages as a navigation suggestion associated with a search box of the web browser. The method further includes pre-fetching web content for at least one web page of the selected group of web pages in advance of a user selection of the at least one web page.

In some implementations, a system comprises at least one processor, and a non-transitory computer-readable medium storing executable instructions that when executed by the at least one processor is configured to execute a server. The server is configured to acquire, over a network, data from a web browser executing on at least one computing device, where the data includes information about a plurality of web pages rendered within one or more browser tabs of the web browser. The server is configured to process the acquired data to group the plurality of web pages into one or more groups of web pages, where each group includes a respective subset of the plurality of web pages. The server is configured to perform a similarity analysis using the acquired data, where each group includes web pages that are determined to be topically related to each other based on the similarity analysis. The server is configured to select a group of web pages from the one or more groups of web pages that is determined to be topically-related to content displayed in the web browser, where the selected group represents a task being carried out by a user. The server is configured to provide, over the network, a navigation suggestion for display on a user interface of the web browser based on the selected group, where the navigation suggestion includes one or more user-selectable elements that assist the user to complete the task.

In some implementations, the system may include one or more of the above/below features (or any combination thereof). The navigation suggestion includes a list of one or more of the web pages of the selected group. The server is configured to generate a plurality of navigation trees based on the acquired data, where each of the plurality of navigation trees includes nodes and links between the nodes, the nodes represent web pages, and the links represent navigation paths between the web pages. The server is configured to cluster a subset of the plurality of navigation trees into a cluster group based on the similarity analysis, and identify the group of web pages from the cluster group. The server is configured to filter the cluster group to not include one or more web pages of the cluster group within the group of web pages. The nodes of the navigation trees of the cluster group include one or more hub nodes, one or more leaf nodes, and one or more intermediate nodes, and the server is configured to filter the cluster group to remove web pages represented by the intermediate nodes. The server is configured to filter the cluster group based on determined values for one or more user engagement metrics, where each determined value of a user engagement metric indicates an amount of user engagement with a respective web page of the group. The server is configured to provide the navigation suggestion in a tab switcher interface of the web browser.

In some implementations, a non-transitory computer-readable medium storing executable instructions that when executed by at least one processor are configured to execute a web browser. The web browser is configured to send, over a network, data to a server associated with the web browser, where the data includes information about a plurality of web pages rendered within one or more browser tabs of the web browser, display content in a user interface of the web browser, receive, over the network, a navigation suggestion in response to the content being displayed in the user interface of the web browser, where the navigation suggestion identifies a group of web pages, the group of web pages is a subset of the plurality of web pages rendered within the one or more browser tabs, and the group of web pages includes web pages that have been determined to be topically related to each other, and display the navigation suggestion on the user interface of the web browser, where the navigation suggestion displays content of one or more of the web pages of the group as one or more user-selectable elements, and each user-selectable element is selectable to access a respective web page of the group.

In some implementations, the web browser is configured to pre-fetch web content for at least one web page of the group of web pages in advance of a user selection of a user-selectable element for the at least one web page. The navigation suggestion displays a list of the web pages of the group in chronological order. The navigation suggestion is displayed in a tab switcher interface of the web browser. The web browser is configured to display a selectable link to the group on the user interface of the web browser, and display a list of the web pages of the group in response to a user selection of the link. The web browser is configured to display the selectable link to the group in a bookmark section of the web browser. The web browser is configured to display a selectable link to the group as a navigation suggestion in response to one or more search terms being entered in a search box of the web browser.

The details of one or more implementations are set forth in the accompanying drawings and the description below. Other features will be apparent from the description and drawings, and from the claims.

BRIEF DESCRIPTION OF THE DRAWINGS

FIG. 1A illustrates a system for facilitating user navigation in a web browser executing on a computing device.

FIG. 5A illustrates an example of a navigation suggestion.

FIG. 12A illustrates a screenshot of the web browser.
FIG. 12B illustrates a screenshot of the web browser.
FIG. 12C illustrates a screenshot of the web browser.
FIG. 12D illustrates a screenshot of the web browser.
FIG. 12E illustrates a screenshot of the web browser.
FIG. 12F illustrates a screenshot of the web browser.
FIG. 12G illustrates a screenshot of the web browser.
FIG. 13H illustrates a screenshot of the web browser.
FIG. 13I illustrates a screenshot of the web browser.
FIG. 13K illustrates a screenshot of the web browser.
FIG. 13L illustrates a screenshot of the web browser.
FIG. 13M illustrates a screenshot of the web browser.
FIG. 14 illustrates a screenshot of the web browser.
FIG. 15 illustrates a screenshot of the web browser.

DETAILED DESCRIPTION

Figure 1B:
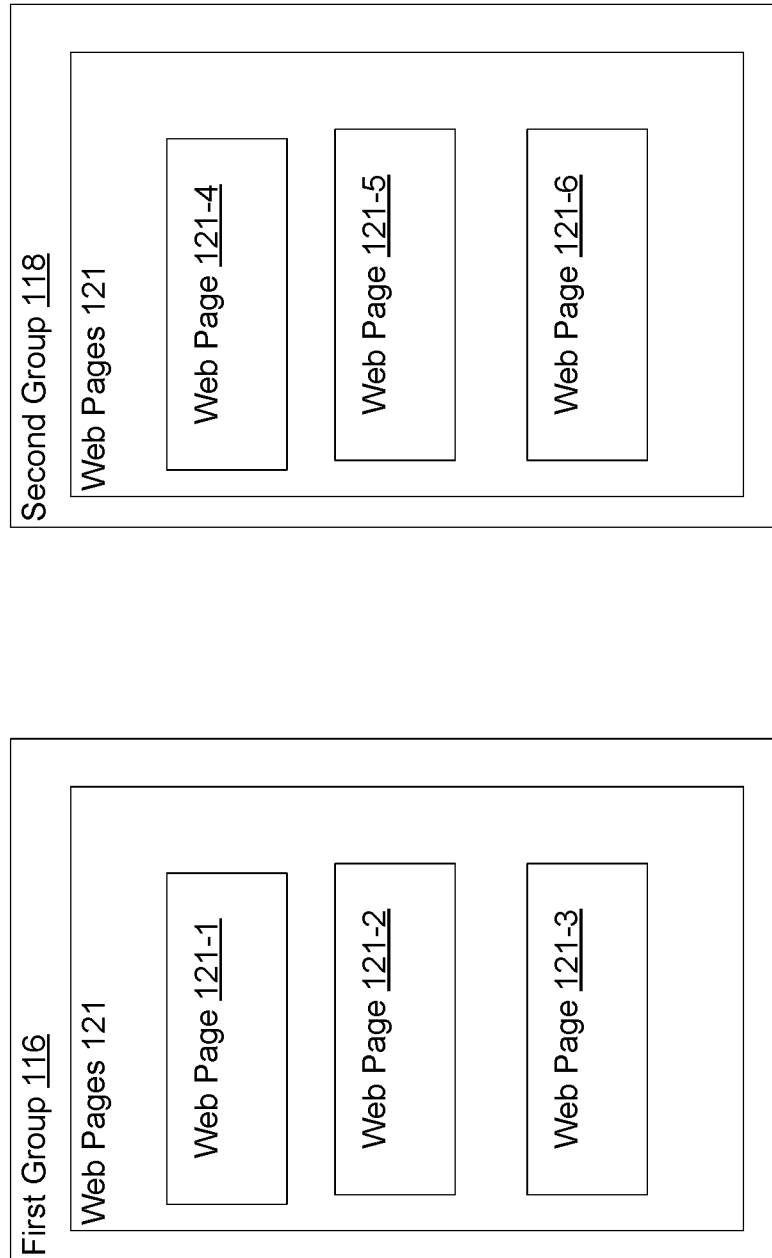
FIG. 1B illustrates an example of a first group of web pages and an example of a second group of web pages.

Discussed herein are techniques that provide contextually-relevant navigation suggestions to the user to help the user complete a task. These techniques can be implemented in various software applications, including a web browser, a mobile application running on a mobile device or a natively-operating executing on a desktop computer. For example, a user may use a web browser to carry out a task by searching the World Wide Web for content (e.g., researching a movie to decide whether to see the movie in a theatre). For example, a user may start with a web search to get search results about the movie, navigate to one or move reviews about the movie, navigate to a trailer of the movie, navigate to web pages that provide information about the cast of the movie, etc. During the course of displaying these different web pages to the user, existing web browsers may not have an understanding of the task the user is trying to accomplish, which prompted the loading and rendering of these particular pages.

In contrast, this disclosure describes techniques for using a similarity analysis to capture those web pages that relate to the user's task and for automatically displaying navigation suggestions to the user to help the user accomplish the task. For instance, in the movie example, after the user reads one or more reviews about the movie, views the trailer of the movie, and reads information about the cast of the movie, the user may decide to see the movie in a movie theatre, but may want to convince a friend to see the movie with her. At this point, the user may want to find the web page having the movie trailer so that the user can send a link to the trailer to convince the friend to see the movie. Also, at this point, the user may have multiple browsing tabs opens that may or may not include the web page with the movie trailer. In addition, the user may be performing different tasks, unrelated to the movie task, while using the web browser during the course of searching for a movie. For example, the user may be viewing the news or researching dog breeds, etc. As such, the web browser may have many open browser tabs, where the history of the browser tabs may span across multiple tasks (or journeys). Often, instead of switching to other browser tabs or viewing the browsing history of the web browser, the user may simply open a new browser tab to search for the movie trailer.

However, a web browser implementing the techniques discussed herein may use a similarity analysis to determine which web pages are topically related to a particular task (e.g., determining whether to see the movie), and, when the user's browser activity relates to that task, the web browser may automatically display pages relating to the task (and/or other navigation suggestions, such as a suggested page or a suggested action that helps the user accomplish the task). For example, in some implementations, the navigation suggestion includes a list of previously-rendered web pages in which the user is likely to return to. In some implementations, the navigation suggestion includes a suggested web page (e.g., a web page in which the user has not yet visited). In some implementations, the navigation suggestion includes a suggested course of action (e.g., a sequential display of navigation suggestions to complete the task).

The techniques discussed herein may reduce the amount of computational resources of a computing device executing the web browser by programmatically providing one or more navigation suggestions (e.g., the list of previously-rendered web pages, a suggested web page, a suggested action(s), etc.) to a user in order to accomplish and/or complete the task associated with use of the web browser. For example, the number of browsers tabs that otherwise would be launched to accomplish the task may be reduced and/or the execution time required to re-search or re-find relevant web pages to accomplish the task may be reduced, thereby decreasing the amount of computational resources consumed by the computing device (e.g., computational resources may be "freed up") and increasing the efficiency of the web browser itself.

In the movie example, the navigation suggestion may include a list of previously-rendered web pages that the user is likely to return to complete the task, which includes the movie trailer. This list of web pages (which includes a page having the movie trailer) may be presented as selectable user interface (UI) elements, where a selection of a UI element causes the web browser to display a respective web page in a browser tab. As such, the user may not need to open a new browser tab to re-search for the movie trailer or figure out which browser tab has the content the user is looking for. Rather, when it is determined that the user is currently carrying out a task, the web browser automatically provides a navigation suggestion to the user to help accomplish the task.

In the movie example, since the content about the cast of the movie is contextually relevant to the list (or group) of web pages relating to the task of determining whether to see the movie, a selection to the web page having the movie trailer may be automatically provided in a user interface of the web browser, and when that web page is selected, the web browser may display the web page having the movie trailer in a browser tab. In some implementations, the web browser may pre-fetch the web content of some or all of the group's web pages. For example, the web browser may acquire the web content, via the Internet, from the websites that correspond to some or all of the group's web pages in a background operation of the web browser prior to (i.e., in advance of) the user selecting or navigating to one of more of the group's web pages. This advantageously tends to allow for the web content to be rendered to the user faster. Also, this advantageously tends to allow for offline rendering of the web content to the user.

In addition, user reaction to the navigation suggestions can be monitored to create a feedback loop to refine further recommendations. For example, the user may decide to select a navigation suggestion provided by the web browser. Also, the user may decide to select one particular navigation suggestion over other navigation suggestions, or not select any of the navigation suggestions but rather navigate to a web page not suggested by the navigation suggestions. Future navigation suggestions may be refined based on the user's reaction to the navigation suggestions. In addition, future navigation suggestions may be refined based on other user's reaction to the same or similar navigation suggestions. This advantageously tends to allow more accurate navigation suggestions over time. In some implementations, the user may be provided with controls allowing the user to make an election as to both if and when the web browser and/or the system may enable the monitoring of user reaction to navigation suggestions.

In some examples, the similarity analysis is performed by the web browser or other software application executing on a device that renders content to a user. In some examples, the similarity analysis is performed at a server associated with the web browser or software application. For example, as the user navigates through various searches and/or websites using the web browser, the web browser may acquire data about the web pages rendered by the browser tabs, and the server or the web browser may determine a group of web pages previously rendered by the web browser that are topically related to each other based on a similarity analysis of the data. The group of web pages may include two or more web pages that are determined to be topically-related to each other, which may indicate that the user is carrying out a task.

FIG. 1A illustrates a system 100 for providing one or more navigation suggestions 128 to assist a user for completing a task using a web browser 122 executing on a computing device 120. As a user navigates through content using the web browser 122, the web browser 122 may acquire data 101 about the web pages 121 visited by the web browser 122. In some implementations, the web browser 122 may transmit at least a portion of the data 101, over a network 130, to a server 102 associated with the web browser 122.

Based on the data 101 received from the web browser 122 over the network 130, the server 102 may determine that the user is performing a task based on the data 101. A task may be a web searching activity related to the same or similar subject matter. In some implementations, the task may refer to an activity of a single topic or category that is carried out by navigating the web browser 122. Some non-limiting examples may include researching a hiking trip in a certain area, researching dog breeds, researching a particular movie to see in a movie theater, or for purchasing a vacuum cleaner on the Internet. In some implementations, the web browser 122 determines that the user is performing a task based on the data 101. Although the following description indicates that some of the operations are performed by the server 102, in some implementations, these operations may be performed by the web browser 122 executing on the computing device 120.

In some implementations, the server 102 determines that the user is carrying out a task by determining a first group 116 of web pages 121 from the web pages 121 previously rendered by browser tabs 126 of the web browser 122. A web page 121 may be an instance of a web page being (or having been) loaded (or reloaded) in the web browser 122. Different web pages 121 may relate to different web pages of the same Internet site or web pages of different Internet sites. The first group 116 of web pages 121 may include the web pages that correspond to a particular task that the user is carrying out using the web browser 122.

The data 101 may include navigation information related to the identification and information about the web pages 121 rendered by the browser tabs 126, and/or the level of user engagement with the web pages 121. In particular, the web browser 122 may include a search box for carrying out Internet searches, an address bar to enter website addresses, as well as other navigation tools such as bookmarks, browsing history, etc. Also, the web browser 122 may define forward and back buttons to navigate through previously viewed web pages, and through the use of the web browser 122, the web pages may provide a navigation bar, sitemap, dropdown menu, etc. to navigate through the Internet site. The data 101 may be generated through any of the above-identified navigation tools (or any other navigation tools provided by web browsers/web pages).

In some implementations, the data 101 may include information specifying actions performed by the user using any of the navigation tools, corresponding timestamps, etc. Also, the data 101 may include information specifying user interaction with any of the presented content (e.g., time spent viewing web pages, how many pages the user opens from a given page, audio playback, etc.). In some implementations, the user associated with the same account may sync information across multiple computing devices in which the data 101 from a first web browser executing on a first computing device may be used in conjunction with the data 101 from a second web browser executing on a second computing device (and so forth) to determine the groups.

In some examples, the data 101 includes search terms entered, contextual information (e.g., history of navigation of users or for other users, time spent, trends), user profile information, information from prior browser instances/sessions, and/or information from a different browser. In some examples, the data 101 includes content and/or metadata of the webpages. In some examples, the user may be provided with controls allowing the user to make an election as to both if and when the web browser 122 and/or the system 100 may enable the collection of the data 101 and/or whether one or more types of the data 101 can be used in the similarity analysis to determine whether the user is carrying out a particular task.

FIG. 1B illustrates an example of the first group 116 and an example of a second group 118. As shown in FIG. 1B, the first group 116 of web pages 121 includes the web pages 121 previously rendered by the browser tabs 126 that are topically related to each other. For example, the first group 116 may include a first web page 121-1, a second web page 121-2, and a third web page 121-3. Each web page 121 of the first group 116 is a different web page (e.g., HTML file) of an Internet site that topically relates other web pages 121 of the first group 116. The web pages 121 of the first group 116 may represent a first task that is being carried out by the user. For example, the web pages 121 of the first group 116 may be topically-related to the first task.

In some implementations, the server 102 may determine the second group 118 of web pages 121 from the web pages 121 previously rendered by the browser tabs 126 of the web browser 122. As shown in FIG. 1B, the second group 118 of web pages 121 includes the web pages 121 previously rendered by the browser tabs 126 that are topically related to each other. For example, the second group 118 may include a forth web page 121-4, a fifth web page 121-5, and a sixth web page 121-6. The web pages 121 of the second group 118 may be topically different from the web pages 121 of the first group 116. Each web page 121 of the second group 118 is a different web page (e.g., HTML file) of an Internet site that topically relates other web pages 121 of the second group 118. Although three web pages 121 are shown with respect to the first group 116 and the second group 118, the first group 116 and the second group 118 may include any number of web pages 121. The web pages 121 of the second group 118 may represent a second task that is being carried out by the user. For example, the web pages 121 of the second group 118 may be topically-related to the second task, where the second task is different than the first task. Although two tasks are described with reference to FIGS. 1A and 1B, the user may be carrying out more than two tasks, and therefore, there may be a third group, forth group, fifth group, etc.

The server 102 may provide, over the network 130, one or more navigation suggestions 128 to the web browser 122 in response to content displayed in the web browser 122 being topically related to one of the tasks (e.g., the first task or the second task). For example, in response to the content displayed in the web browser 122 being topically-related to the first group 116, the server 102 may send a navigation suggestion 128 to the web browser 122 for display in order to help the user carry out the first task. In some implementations, the navigation suggestion 128 includes a list (or a subset) of the web pages 121 of the first group 116. In some implementations, the web pages 121 of the first group 116 are filtered or sorted based on the times in which the web pages 121 were accessed or rendered, and/or the level of user engagement with the web pages 121, and the filtered or sorted list of web pages 121 of the first group 116 are provided as one or more navigation suggestions 128 on the user interface 124 of the web browser 122, which provides the web pages 121 that the user is likely to re-visit to complete or continue with the first task.

In some implementations, the navigation suggestion 128 includes a suggested web page (e.g., not part of the first group 116) but topically-related to the first group 116 to help the user with the first task. For example, in some implementations, the data 101 may indicate that other users that carried out tasks similar to the first task visited a particular web page to continue or complete the tasks similar to the first task. Based on the data 101, a suggested web page may be provided as a navigation suggestion 128.

In some implementations, the navigation suggestion 128 includes a suggested course of action to help the user with the first task. For example, the navigation suggestion 128 may include a sequence of web pages 121 (e.g., previously rendered or suggested), search ideas, and/or other actions that provides a suggested course of action to assist the user to continue or complete the first task.

In some implementations, the user may switch tasks, and the content displayed by the web browser 122 may relate to the second task. In this case, in response to the content displayed in the web browser 122 being topically-related to the second group 118, the server 102 may send one or more navigation suggestions 128 to the web browser 122 for display in order to help the user carry out the second task. In some implementations, the navigation suggestion 128 includes a list (or a subset) of the web pages 121 of the second group 118. In some implementations, the web pages 121 of the second group 118 are filtered or sorted based on the times in which the web pages 121 were accessed or rendered, and/or the level of user engagement with the web pages 121, and the filtered or sorted list of web pages 121 of the second group 118 are provided as one or more navigation suggestions 128 on the user interface 124 of the web browser 122, which provides the web pages 121 that the user is likely to re-visit to complete or continue with the second task. In some implementations, the navigation suggestion 128 includes a suggested web page (e.g., not part of the second group 118) but topically-related to the second group 118 to help the user with the second task. In some implementations, the navigation suggestion 128 includes a suggested course of action to help the user with the second task.

The navigation suggestions 128 may reduce the amount of computational resource of the computing device 120 (e.g., computation time and/or memory space used) consumed by the web browser 122 by programmatically providing one or more navigation suggestions 128 to a user in order to accomplish and/or complete a task associated with use of the web browser 122. For example, through the use of the navigation suggestion 128, the number of browsers tabs 126 that otherwise would be launched to accomplish the task may be reduced and/or the execution time required to re-search or re-find relevant web pages 121 to accomplish the task may be reduced, thereby decreasing the amount of computational resources consumed by the computing device 120 (e.g., computational resources may be "freed up") and increasing the efficiency of the web browser 122 itself.

In some implementations, the group's web pages 121 may be the pages in which the user is likely to revisit or return to in order to complete the task. As such, the web browser 122 may speed up user navigation to those web pages 121 by enabling the user to quickly access those web pages 121. In some implementations, the web browser 122 may pre-fetch the web content of some or all of the group's web pages 121 or other web pages 121 provided by the navigation suggestions 128. For example, the web browser 122 may acquire the web content, via the Internet, from the websites that correspond to some or all of the web pages 121 provided in the navigation suggestions 128 in a background operation of the web browser 122 prior to (i.e., in advance of) the user selecting or navigating to one of more of the web pages 121 provided in the navigation suggestions 128. In some implementations, in the background operation (and before the user selects or navigates to one or more of the web pages 121 in the navigation suggestions 128), the web browser 122 may acquire the web content by loading a native library of the web browser 122, performing a domain name system (DNS) lookup based on the URL associated with a particular web page 121, downloading the web content from a server, and caching the web content. These acquiring operations may be performed for some or all of the web pages 121 (e.g., the group's web pages 121 or a suggested web page 121) in the navigation suggestions 128.

This advantageously tends to allow for the web content to be rendered to the user faster. For example, since the web content has already been acquired, when the user actually selects or navigates to a particular web page 121 in the navigation suggestions 128, the web browser 122 may only display the web content in the browser tab 126. Also, this advantageously tends to allow for offline rendering of the web content to the user. In some implementations, the web browser 122 may pre-fetch at least one resource of the web browser 122. The resources of the web browser 122 may include a language translation service, form autofill, and a password vault, as well as other browser resources. In some implementations, in the background operation (and before the user selects or navigations to one or more web pages 121 in the navigation suggestions 128), the web browser 122 may acquire the web content for one or more web pages 121 in the navigation suggestions 128 and then translate the page into a language associated with the user account using the language translation service.

In some implementations, the computing device 120 is a mobile computing device such as a mobile phone, tablet, or personal digital assistant. The computing device 120 includes a network interface configured to connect the computing device 120 to the network 130 (e.g., the Internet). The network interface may include a mobile network interface and/or Wi-Fi network interface. In some implementations, the web browser 122 is a mobile browser designed for use on an operating system of a mobile device. The mobile browser is configured to render and display mobile tabs with web pages in a mobile format (or in a desktop format). In some implementations, the computing device 120 is a laptop, a desktop computer, or other computing device having an operating system configured to execute the web browser 122 to retrieve and display Internet content in the desktop format.

The mobile format has a different page layout than the desktop format. In the mobile format, there is not a tab strip that identifies the open browser tabs 126. Rather, in the mobile format, the web browser 122 includes a tab switcher user interface (UI) that allows the user to switch to other open browser tabs 126. In some implementations, the tab switcher UI includes a vertical layout (or vertical carousal) that lists the open browser tabs 126 and the sites loaded in those browser tabs 126. In some implementations, the browser tabs 126 are stacked vertically with one browser tab 126 displayed fully and others in front or behind the active browser tab 126. In some implementations, the tab switcher UI includes a horizontal layout (or horizontal carousal). In some implementations, in the tab switcher UI, the browser tabs 126 are displayed in a horizontal layout, and the user can swipe to the right or left to select other open browser tabs 126.

Each browser tab 126 may be a container for a web page 121 of an Internet site. Conventionally, on a mobile device, a browser tab 126 is opened and closed manually, and creating a new browser tab 126 may take three taps and, in some cases, approximately two seconds (vs. one click on a desktop, for example). Also, it has been found that closing browser tabs 126 is relatively common. For example, users often close browser tabs 126 just for the sake of decluttering. However, as further described below, the navigation suggestion operations discussed herein may automatically provide the navigation suggestion 128 in which the user is likely to view again and/or assist with completing his/her task.

The web pages 121 of the first group 116 may have been rendered (at some point) across one or multiple browser tabs 126. Similarly, the web pages 121 of the second group 118 may have been rendered (at some point) across one or multiple browser tabs 126. In some implementations, the first group 116 of web pages 121 may be considered a journey (i.e., a real-world task carried out by the web browser 122) which occurs over time. A particular journey may span across one, two, or more than two browser tabs 126. In other words, a journey can span multiple browser tabs 126, and a browser tab 126 can be present in multiple different journeys. As shown in FIG. 1A, the web browser 122 may include three browser tabs 126, i.e., a first browser tab 131, a second browser tab 132, and a third browser tab 133. In some implementations, a particular group of web pages 121 may be defined over a period of time, and may span across multiple browsing sessions over multiple days (or weeks). In some implementations, the web pages 121 of the first group 116 and/or the second group 118 may include the web pages 121 of active (or currently-open) browser tabs 126 that are topically related to each other. In some implementations, the web pages 121 of the first group 116 and/or the second group 118 are web pages 121 from previously opened or closed browser tabs 126. In some implementations, the web pages 121 of the first group 116 and/or the second group 118 are a mixture of web pages 121 from currently-open browser tabs 126 and web pages from closed browser tabs 126.

Figure 2:
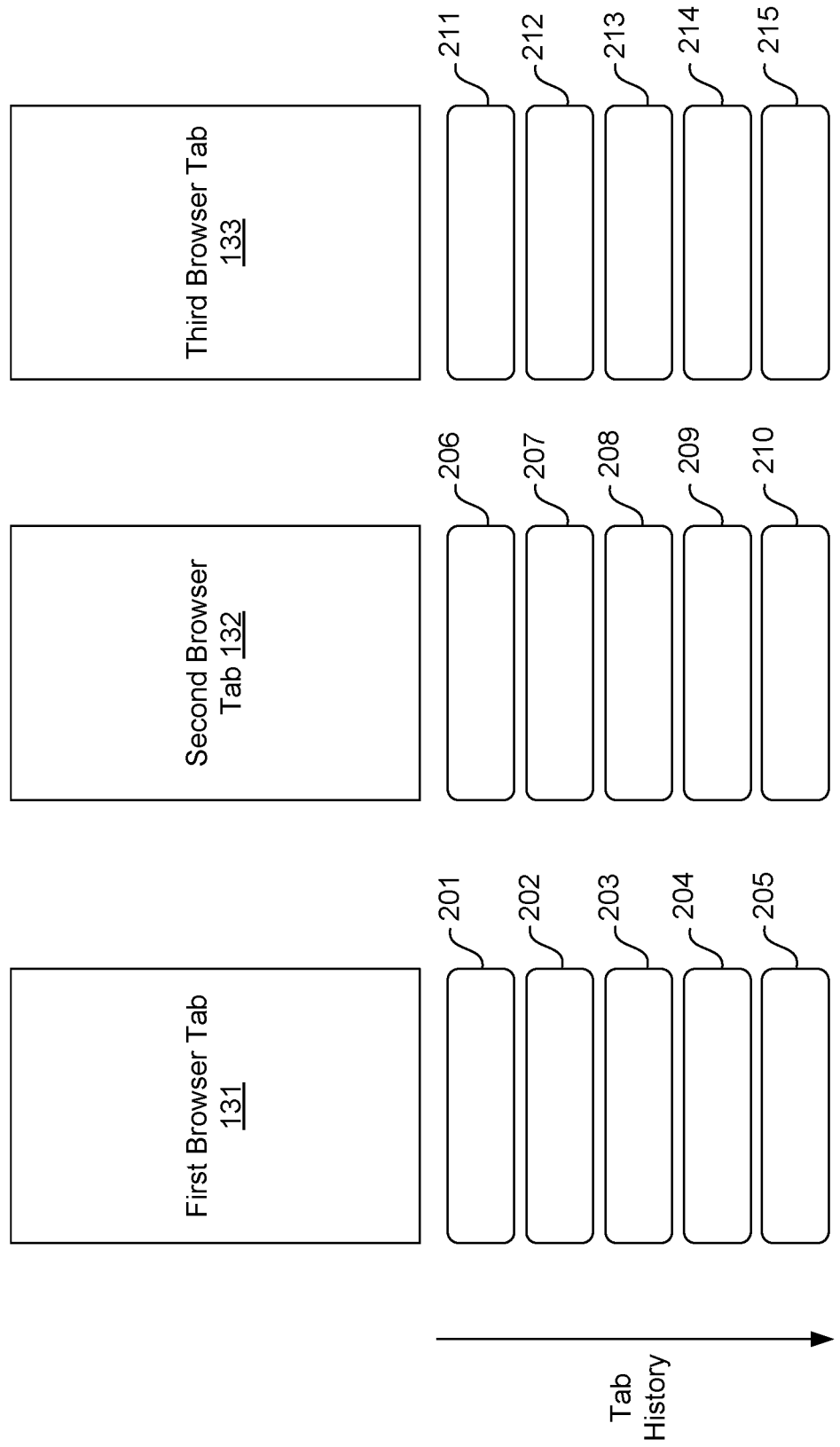
FIG. 2 illustrates a graphical representation of the tab history of a first browser tab, a second browser tab, and a third browser tab.

FIG. 2 illustrates a graphical representation of the tab history of the first browser tab 131, the second browser tab 132, and the third browser tab 133. The various web pages 201-215 of FIG. 2 are examples of the web pages 121. The first browser tab 131 may include web page 201, web page 202, web page 203, web page 204, and web page 205, where the web page 201 is the most recent web page (or current web page) of the first browser tab 131. The second browser tab 132 may include web page 206, web page 207, web page 208, web page 209, and web page 210, where the web page 206 is the most recent web page (or current web page) of the second browser tab 132. The third browser tab 133 may include web page 211, web page 212, web page 213, web page 214, and web page 215, where the web page 211 is the most recent web page (or current web page) of the third browser tab 133.

The web page 201 and the web page 202 may relate to task A (or journey A) (e.g., looking up who played Doctor Strange in Avengers: Infinity War), web page 203 through web page 206 may relate to task B (or journey B) (e.g., catching up on the news), and web page 207 through web page 215 may relate to task C (or journey C) (e.g., researching dog breeds). As further discussed below, the server 102 may determine the first group 116 as including the web page 201 and the web page 202 (which are from the first browser tab 131) because the web page 201 and the web page 202 are topically related to each other. The server 102 may determine the second group 118 as including web page 203 through web page 206 (which are from the first browser tab 131 and the second browser tab 132), and the server 102 may determine a third group as including web page 207 through web page 215 (which are from the second browser tab 132 and the third browser tab 133) because the web page 207 through web page 215 are topically related to each other.

Referring back to FIG. 1A, in some implementations, the server 102 may be configured to synchronize user actions, browser history, and browser configurations across computing devices (including the computing device 120) associated with a user account. For example, a user may bookmark a particular web page using the web browser 122 on the computing device 120. If other computing devices are associated with the user's account on the server 102, data may be transmitted from the computing device 120 to server 102 and on to the other computing devices such that the bookmark also appears in the web browser 122 running on the other computing devices.

In some implementations, user actions may be synchronized across computing devices. User actions that may be synchronized across computing devices may include, but are not limited to, opening a window, closing a window, opening a webpage or file, closing a webpage or file, navigating to a particular URL, scrolling to a location within a document, playing a stream of media content, running a Javascript element, or any other action associated with operating the web browser 122. In some implementations, the user action may be a Document Object Model (DOM) event. DOM events may include standardized DOM events promulgated by the World Wide Web Consortium (W3C), the primary standards organization for the Internet, and/or may include browser-specific DOM events. In general, DOM events allow webpages to include code that is conditioned on the detection of a certain event. In some implementations, DOM events may include receiving an input from an interface device (e.g., a mouse or other pointing device, a keyboard, a touchscreen display, etc.). For example, a DOM event may correspond to clicking on a webpage object using a mouse, pressing an up arrow on a keypad, touching a touchscreen display, etc. DOM events may also include actions such as loading or unloading a webpage, resizing a window of the web browser 122, performing a clipboard action (e.g., selecting an object, copying an object, pasting an object, etc.), dragging data within the webpage or between the web browser 122 and another application, opening or closing a window, detecting an error, or other events related to the operation of the web browser 122.

In some examples, as the web browser 122 is being executed on the computing device 120, the web browser 122 sends, over the network 130, the data 101 about the accessed web pages 121 to the server 102.

The network 130 may include the Internet and/or other types of data networks, such as a local area network (LAN), a wide area network (WAN), a cellular network, satellite network, or other types of data networks. The network 130 may also include any number of computing devices (e.g., computer, servers, routers, network switches, etc.) that are configured to receive and/or transmit data within network 130. Network 130 may further include any number of hardwired and/or wireless connections.

The server 102 may include a navigation tree builder 104 configured to generate navigation trees 114 based on the data 101. For example, the navigation tree builder 104 may generate a new navigation tree 114 when a user starts a search (e.g., entering one or more terms into a search box of the web browser 122), selects on a link in the browsing history, and/or selects a bookmark. The navigation tree builder 104 may create new page nodes when the user navigates from the root node, e.g., when particular web pages 121 are rendered in the browser tabs 126. For example, each navigation tree 114 may start with a search or a bookmark, and as the user navigates from a page or search results (e.g., selects a particular search result, selects a link on a page, selects the back/forward button, etc.), the navigation tree builder 104 may create page nodes that correspond to the different web pages 121, and create links or edges between the page nodes. For a particular user account, there may be many separate navigation trees 114. As an example, FIG. 1A illustrates a first navigation tree 114-1, a second navigation tree 114-2, and a third navigation tree 114-3. However, the navigation trees 114 may include more than three navigation trees 114.

Figure 3:
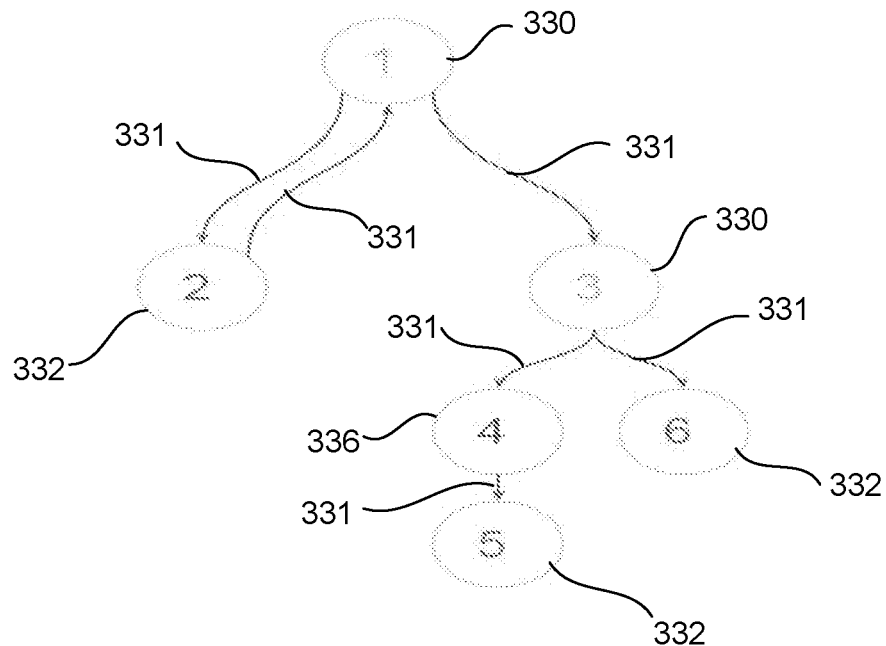
FIG. 3 illustrates an example of a navigation tree.

FIG. 3 illustrates an example of a navigation tree 114. The navigation tree 114 may be an example of the first navigation tree 114-1, the second navigation tree 114-2, or the third navigation tree 114-3. The navigation tree 114 may be a hierarchical data structure that shows the relationships between navigated web pages 121 of Internet sites by the web browser 122. In some implementations, some of the data 101 is represented in the navigation tree 114. The navigation tree 114 includes page nodes (1, 2, 3, 4, 5, and 6) and links 331 (e.g., incoming edges, outgoing edges) between the page nodes. Each page node corresponds to a respective different web page 121 rendered by the web browser 122. The page nodes may include hub nodes 330, leaf nodes 332, and intermediate nodes 336 disposed between the hub nodes 330 and the leaf nodes 332.

As shown in FIG. 3, a user may direct the web browser 122 to display a first web page (represented by page node 1) (e.g., by starting a new search), and navigate to a second web page (represented by page node 2), where a link 331 is provided from the page node 1 to the page node 2. The page node 1 may be considered a root, i.e., the top node in the navigation tree 114, and the page node 2 is a child node of the page node 1, i.e., a node directly connected to another node when moving away from the root. Then, the user may navigate back to the first web page, where a link 331 is provided from the page node 2 to the page node 1. The page node 2 is a leaf node 332 because the page node 2 does not have a child node. Then, a user may navigate to a third web page (represented by page node 3), where a link 331 is provided from the page node 1 to the page node 3. The page node 1 is a hub node 330 because the page node 1 has at least two child nodes directly connected to it. Then, a user may navigate to a fourth web page (represented by page node 4), and then to a fifth web page (represented by page node 5). From the third web page, the user may navigate to a sixth web page (represented by page node 6). The page node 3 is a hub node 330, the page node 5 is a leaf node 332, and the page node 6 is a leaf node 332. The page node 4 is an intermediate node 336.

The server 102 may include a journey-centric task builder 106 configured to determine the first task and/or the second task by constructing the first group 116 and/or the second group 118 (and any additional groups) from the web pages 121 rendered by the browser tabs 126. Also, the journey-centric task builder 106 may filter and/or sort the web pages 121 of the first group 116 and/or the second group 118 to determine which web pages 121 are included within the navigation suggestions 128.

The journey-centric task builder 106 may include a similarity analyzer 108 configured to group similarly-related navigation trees 114 into a navigation group using a similarity analysis. In some implementations, the similarity analysis includes hierarchical clustering. In some implementations, the similarity analyzer 108 is configured to determine the first group 116 of web pages 121 from the web pages 121 previously rendered by the web browser 122 based on a similarity analysis of the navigation trees 114 such that the first group 116 of web pages 121 includes two or more web pages having content topically related to each other. In some implementations, the similarity analyzer 108 is configured to cluster a first subset (e.g., two or more) of the navigation trees 114 into a first cluster group based on the similarity analysis, and identify the first group 116 of web pages 121 from the first cluster group. The similarity analyzer 108 is configured to cluster a second subset (e.g., two or more) of the navigation trees 114 into a second cluster group based on the similarity analysis, and identify the second group 118 of web pages 121 from the second cluster group.

In some implementations, the similarity analyzer 108 may represent each navigation tree 114 with keywords and associate a probability with each of the keywords indicating a relative likelihood that a particular keyword represents its navigation tree 114. For example, the similarity analyzer 108 may represent each web page 121 with a set of keywords, and each of the keywords may represent a relative likelihood that a particular keyword represents that web page 121. In some implementations, the probabilities are determined based on term frequency and/or inverse document frequency techniques. For a particular navigation tree 114, the similarity analyzer 108 may accumulate all the keywords in all the web pages 121 in the navigation tree 114. The similarity analyzer 108 may create a feature vector based on the keywords and their probabilities.

In an example, a navigation tree 114 relating to Yellowstone national park may have a group of keywords such as parks, bison, geysers, camping, etc., that are associated with the Yellowstone national park navigation tree, and each of those keywords are associated with a respective probability that the keyword represents the navigation tree 114 (e.g., bison has a probability of 0.9 and park has a probability of 0.3). The similarity analyzer 108 may create a feature vector for each navigation tree 114 using the keywords and probabilities, and determine distance (or similarity) vectors based on comparisons of the feature vectors. In some implementations, cosine distance between the feature vectors is used as a distance (or similarity) metric in a clustering algorithm. If the value of the distance metric is above a threshold level, the similarity analyzer 108 server may determine that the corresponding navigation trees 114 are similarly related to the same topic, and include these navigation trees 114 within the cluster group. The web pages 121 of the navigation trees 114 of the cluster group may be identified as the web pages 121 for the group.

In some implementations, the generation of a group of web pages 121 may indicate that the user is carrying out a task. In some implementations, the generation of a particular group of web pages 121 occurs when at least two navigation trees 114 are determined to be topically-related to each other. In some implementations, the generation of a particular group of web pages 121 occurs when a navigation tree 114 has more than a threshold number of nodes (e.g., more than 2 or 3 nodes). As indicated above, each navigation tree 114 is represented by a set of keywords with probabilities. When the keywords of the cluster group are topically related to one or more keywords of content viewed by the user (e.g., the keywords of the currently displayed content having a similarity metric above a threshold level with respect to the keywords of the cluster group), the system 100 may determine that the user is carrying out the task, and provide one or navigation suggestions 128 on the user interface 124 of the web browser 122.

In some implementations, instead of using navigation trees 114, the similarity analyzer 108 may compare content of the web pages 121 (e.g., a page-by-page comparison). For example, keywords associated with a first web page may be compared with keywords associated with a second web page, and, if the similarity comparison results in a similarity metric above a threshold level, the first web page and the second web page are similar to each other in the sense that they relate to the same topic. However, the similarity analyzer 108 may use other types of similarity techniques such as such as string-based similarity including character-based similarity measures (e.g., longest common substring (LCS), Damerau-Levenshtein, Jaro, Jaro-Winkler, etc.), and term-based similarity measures (e.g., block distance, cosine similarity, Dice's coefficient), corpus-based similarity (e.g., Hyperspace Analogue to Language (HAL), Latent Semantic Analysis (LSA)), and/or knowledge-based similarity.

In some implementations, the journey-centric task builder 106 includes a page filter 110 configured to filter the first group 116 (or any other group) of web pages 121 to remove one or more web pages 121 from the first group 116. It is noted that any operations described with reference to the first group 116 can be equally applied to the second group 118. In some implementations, the page filter 110 filters the first group 116 based on a timestamp associated with the web pages 121 of the first group 116. For example, the page filter 110 may remove one or more web pages 121 from the first group 116 that is older than a predetermined time (e.g., remove web pages 121 older than 4 hours, 1 day, 1 week, etc.). In some implementations, the page filter 110 filters the first group 116 based on one or more user engagement metric associated with the web pages 121 of the first group 116. The user engagement metrics may be determined based on or include an amount of user engagement with each web page 121 of the first group 116. The user engagement metrics may include the number of times a particular web page 121 was viewed, interacted with, or loaded, the amount of time spent on a particular web page 121, and a level of engagement with a particular web page 121. If one or more user engagement metrics of a web page 121 of the first group 116 is below a threshold level, the page filter 110 may remove that web page 121 from the first group 116. In some implementations, the page filter 110 may filter the first group 116 based on the navigation trees 114 of the first cluster group. For example, the page filter 110 may filter the web pages 121 to retain the web pages 121 associated with the hub nodes 330 and the leaf nodes 332, but may remove the web pages 121 associated with other nodes (e.g., the intermediate nodes 336). In some implementations, the page filter 110 may filter the web pages 121 of the first group 116 based on any of the above-identified types of the acquired data 101.

Figure 4:
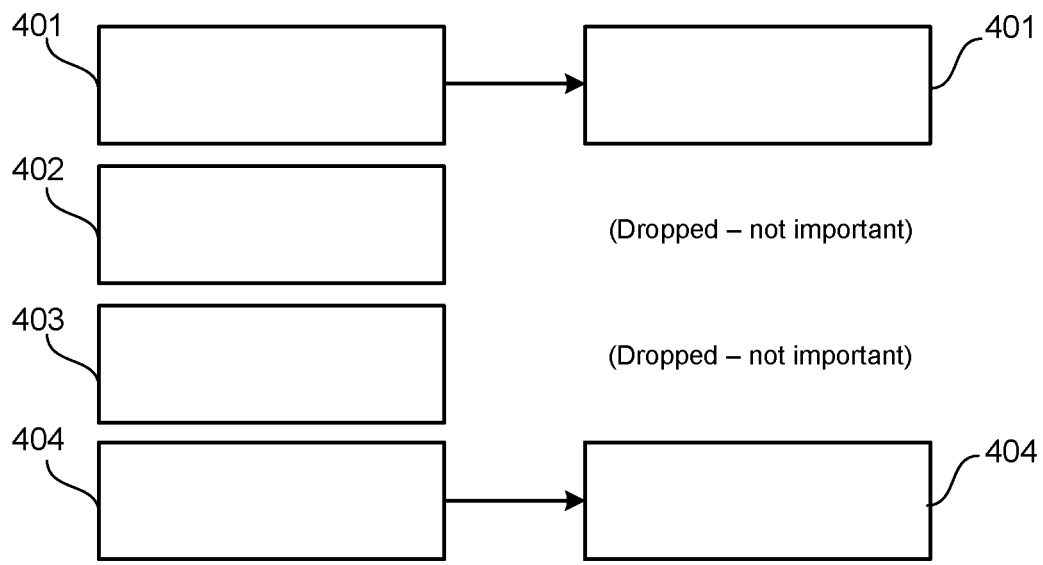
FIG. 4 illustrates a graphical representation of filtering of web pages of a journey to obtain the web pages for an auto-tab list.

FIG. 4 illustrates a graphical representation of an example way of filtering of the web pages 121 of the first group 116. As shown in FIG. 4, the web pages 121 may include web page 401, web page 402, web page 403, and web page 404. These web pages may be rendered (or have been rendered) in one or multiple browsing tabs 126 of a browsing session, and these web pages may be represented in one or more navigation trees 114 associated with a particular cluster group. The page filter 110 may filter these web pages using any of the above-described filtering techniques to remove the web page 402 and the web page 403 from the first group 116.

Referring back to FIG. 1A, the journey-centric task builder 106 includes a page sorter 112 configured to sort the web pages 121 of the first group 116 and/or the second group 118. For example, the page sorter 112 may sort the first group 116 based on timestamps (e.g., the time a particular web page 121 was rendered or accessed) such that the first group 116 includes a chronological order of topically-related web pages 121. In some implementations, the page sorter 112 may sort the first group 116 based on one or more user engagements such that the first group 116 includes a list of topically-related web pages 121 where the web pages 121 having a higher user engagement are placed first on the list.

In some implementations, in the case of mobile (e.g., the computing device 120 is a smartphone, tablet, etc.), switching between multiple browsing tabs 126 to carry out a task may be less likely to occur. Rather, in many instances, in order to locate previously viewed information, the user is likely to create a new browser tab 126 to find the desired web page 121. However, the navigation suggestion 128 is configured to provide a graphical arrangement of one or more web pages 121 of the first group 116 (or the second group 118) in order to assist the user for accomplishing the task, as further described below.

In some implementations, the navigation suggestion 128 may be a user interface element (or element) that provides at least a portion a list of the first group 116 on the user interface 124 of the web browser 122. In some implementations, the navigation suggestion 128 is presented when it is determined that the currently-viewed content is contextually-relevant to the first group 116. In some implementations, the navigation suggestion 128 is a list of the web pages 121 of the first group 116. In some implementations, the navigation suggestion 128 identifies at least a subset of the web pages 121 of the first group 116 as user-selectable links, where upon selection of one of the links, the web browser 122 is configured to reload the selected web page 121 (or provide the pre-fetch or pre-rendered content for the web page 121). In some implementations, the navigation suggestion 128 identifies the title (or short phrase describing the page) of each of the web pages 121 of the first group 116. In some implementations, the navigation suggestion 128 displays a representative image associated with one or more of the web pages 121. In some implementations, the navigation suggestion 128 displays a map and a location on the map associated with one or more of the web pages 121. In some examples, the navigation suggestion 128 provides a sequential display of web pages 121 should be performed to carry out a task.

In some implementations, the navigation suggestion 128 is provided on a browser page that identifies some or all of the web pages 121 of the first group 116, with selectable links to reload the web pages 121 of the first group 116. In some implementations, the browser page identifies the web pages 121 of the first group 116 in a chronological order, where the list is grouped by days in which the web pages 121 of the first group 116 were accessed. In some implementations, the web pages 121 of the first group 116 are disposed in a horizontal or vertical UI carousel. In some implementations, the navigation suggestion 128 identifies the web pages 121 of the first group 116 in chronological order. In some implementations, the navigation suggestion 128 identifies only a portion of the web pages 121 of the first group 116 with an option to expand the navigation suggestion 128 to view the other web pages 121 of the first group 116. In some implementations, the navigation suggestion 128 includes a single vertical card, a visual grid layout that groups the web pages 121 of the first group 116, and/or other type of user interface layout that presents the web pages 121 of the first group 116. In some implementations, the navigation suggestion 128 identifies a plurality of groups (e.g., the first group 116 and the second group 118) with an option to select one of the groups to view that group's web pages 121.

In some implementations, the web browser 122 may display links to the groups in a page (or section) of the web browser 122. In some implementations, the web browser 122 may display links to the groups in a bookmark section of the web browser 122. In some implementations, the web browser 122 may provide a suggestion to one of the groups as the user is using the web browser 122. In some implementations, the web browser 122 may provide a navigation suggestion to the first group 116 when the user is typing one or more search terms into the search box of the web browser 122. For example, in response to the one or more search terms being determined a topically related to the first group 116, the web browser 122 may display a link to the first group 116. Upon selection of the link, the web browser 122 may display a list of the web pages 121 of the first group 116.

FIG. 5A illustrates an example of the navigation suggestion 128 as an auto-tab list 518 having a collection of topically-related auto-tabs. The auto-tabs may include a first auto-tab 520-1, a second auto-tab 520-2, and a third auto-tab 520-3. In some implementations, the web pages 121 of the first group 116 may be the auto-tabs in the auto-tab list 518. In some implementations, the web pages 121 of the second group 118 may be auto-tabs in the auto-tab list 518. In some implementations, a user may select one of the auto-tabs in the auto-tab list 518, which causes the web browser 122 to reload that web page 121 (or provide the pre-fetched or pre-rendered web content) in a particular browser tab 126.

In some implementations, the auto-tab list 518 is a collection of topically related web pages 121 that have been filtered to omit one or more web pages 121 (as previously discussed above). In some implementations, the auto-tab list 518 is a collection of topically-related web pages 121 that correspond to the working set of browser tabs 126. The working set of browser tabs 126 may be the web pages in the currently opened browser tabs 126 and/or the web pages in the back stacks of the currently opened browser tabs 126. In some implementations, the auto-tab list 518 is rendered on the user interface 124 in a UI layout that identifies a chronological list of the web pages 121 of the first group 116. In some implementations, the auto-tab list 518 is a UI layout that identifies the web pages 121 of the first group 116 in an order by likelihood of returning based on one or more user engagement metrics such as the number of times a particular web page 121 was viewed, interacted with, or loaded, the amount of time spent on a particular web page 121, and a level of engagement with a particular web page 121.

In some implementations, the auto-tab list 518 is rendered on the user interface 124 in a list format that identifies the title of the web page 121, the corresponding website, and an image associated with the web page 121 for the web pages 121 of the first group 116 (or the second group 118). In some implementations, the auto-tab list 518 is rendered on the user interface 124 in a carded style format. In some implementations, the auto-tab list 518 is rendered on the user interface 124 in a grid format. In some implementations, the auto-tab list 518 is rendered on the user interface 124 in a tab group format, where the auto-tabs are topically grouped into expandable cards. In some implementations, the auto-tab list 518 is rendered on the user interface 124 in a tab stack format, where the auto-tabs are topically grouped into stacks, and the top auto-tab in each stack is the most recently used tab in the stack. In some implementations, the auto-tab list 518 includes a search section (e.g., search box, search suggestions) that allows the user to search the Internet.

In some implementations, an auto-tab list 518 is rendered by the web browser 122 with respect to a particular browser tab 126. For example, the web browser 122 may have the first browser tab 131 and the second browser tab 132 opened. In some implementations, a user may enter the tab switcher UI with the first browser tab 131 in the foreground. The auto-tab list 518 may be provided in a UI layout at a location proximate to the first browser tab 131. In some implementations, while in the tab switcher UI, the user may place the second browser tab 132 in the foreground, which causes the web browser 122 to provide the auto-tab list 518 in a UI layout at a location proximate to the second browser tab 132. However, if the first browser tab 131 and the second browser tab 132 are topically related to the first group 116, the auto-tab list 518 may include the same (or similar) web pages 121 of the first group 116. If the first browser tab 131 is topically related to the first group 116, the auto-tab list 518 may include a list of the web pages 121 of the first group 116, and the auto-tab list 518 is rendered in a location proximate to the first browser tab 131. If the second browser tab 132 is topically related to the second group 118, the auto-tab list 518 may include a list of the web pages 121 of the second group 118, and the auto-tab list 518 is rendered in a location proximate to the second browser tab 132.

Figure 5B:
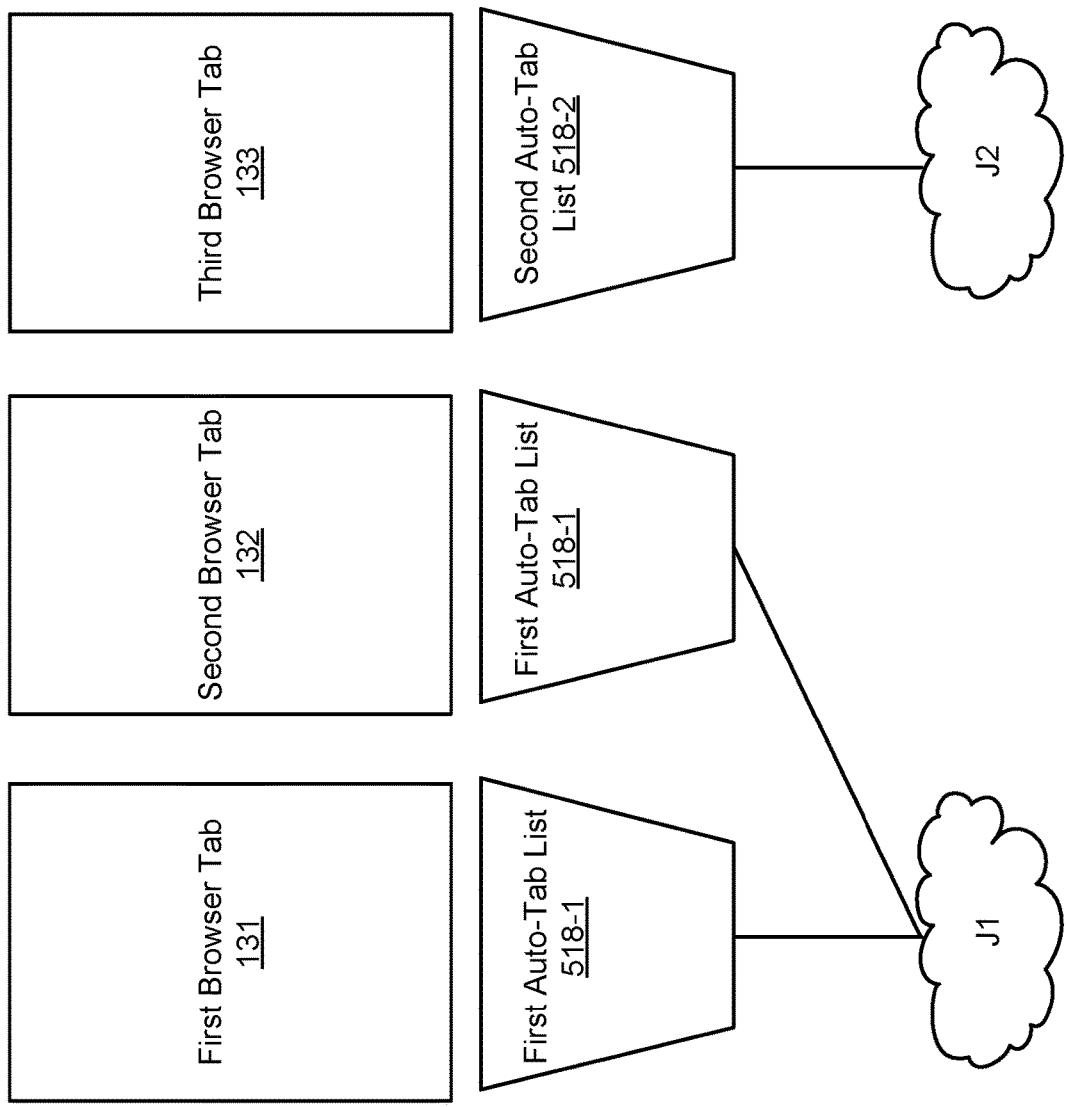
FIG. 5B illustrates a relationship between auto-tab lists and groups.

FIG. 5B illustrates an example relationship between the auto-tab list 518 and groups (or journeys). A first auto-tab list 518-1 may be associated with the first group 116 that relates to a first journey. For example, the first auto-tab list 518-1 may include a list of web pages 121 of the first group 116. In this example, since the first browser tab 131 and the second browser tab 132 topically relate to the first group 116, the first browser tab 131 is associated with the first auto-tab list 518-1 and the second browser tab 132 is associated with the first auto-tab list 518-1. However, the third browser tab 133 is topically related to the second group 118 of a second journey, and the third browser tab 133 is associated with a second auto-tab list 518-2 that includes a list of web pages 121 of the second group 118. The auto-tab list 518 may change if a particular browser tab 126 is topically related to a different group. For example, if the first browser tab 131 becomes topically related to the second group 118, the second auto-tab list 518-2 would be associated with first browser tab 131.

Figure 6:
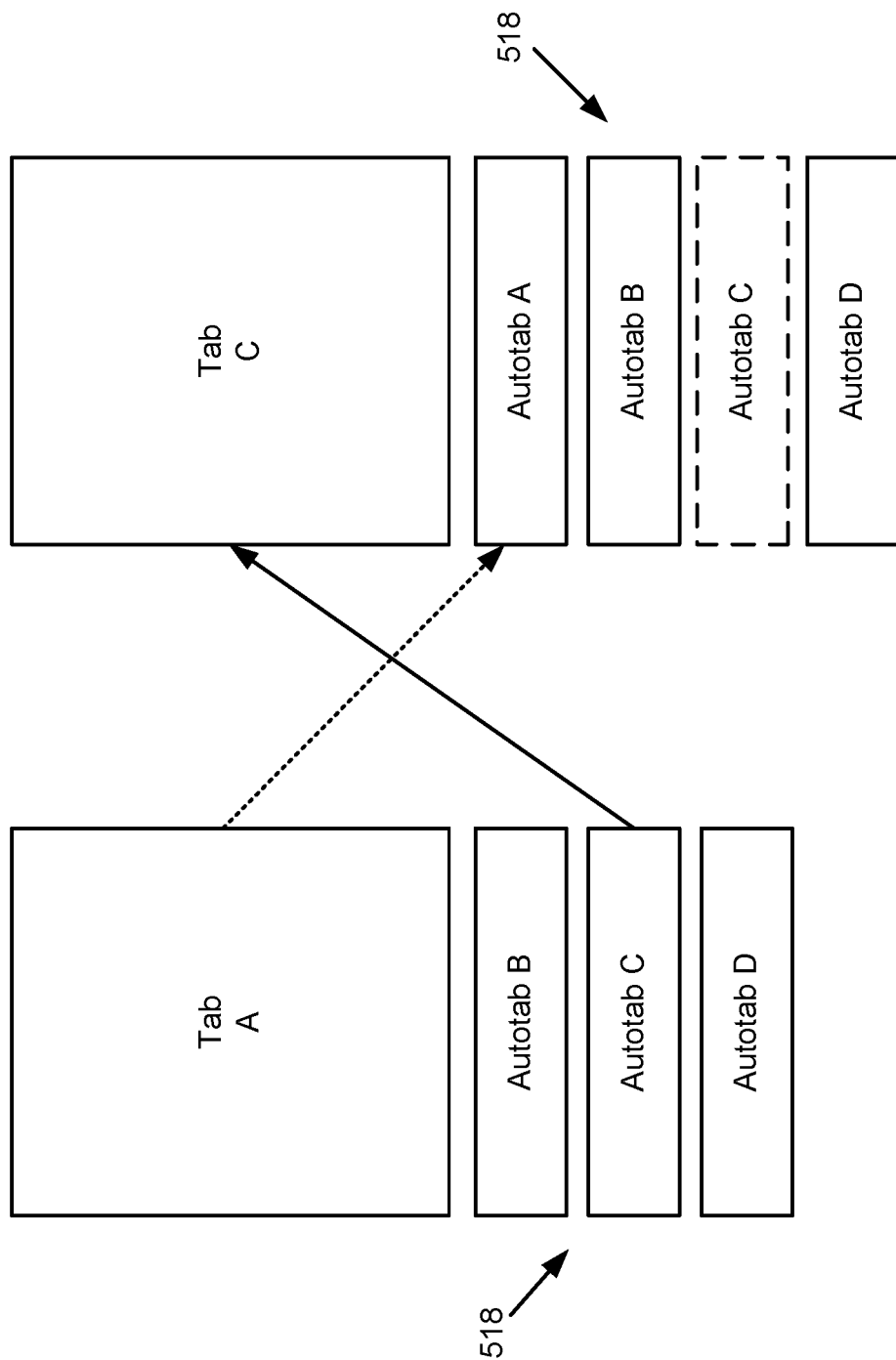
FIG. 6 illustrates an example of switching to an auto-tab in the auto-tab list.

FIG. 6 illustrates an example of switching to an auto-tab in the auto-tab list 518. As shown in FIG. 6, a browser tab (Tab A) is associated with an auto-tab list 518 that identifies auto-tab B, auto-tab C, and auto-tab D. In some implementations, when the user enters the tab switcher UI, the auto-tab list 518 is automatically provided in an area of the user interface 124 that is proximate to browser tab A. A user may select auto-tab C, which causes the web browser 122 to reopen that tab. In some implementations, browser tab C is re-opened with the back stack and scroll position from the previous use of browser tab C. Then, the next time the user comes back to the tab switcher UI, the page that the user switched away from is on the top of the auto-tab list 518. For example, when the user enters the tab switcher UI, the auto-tab list 518 associated with browser tab C includes the same auto-tabs along with browser tab A, which was the last viewed browser tab.

Figure 7:
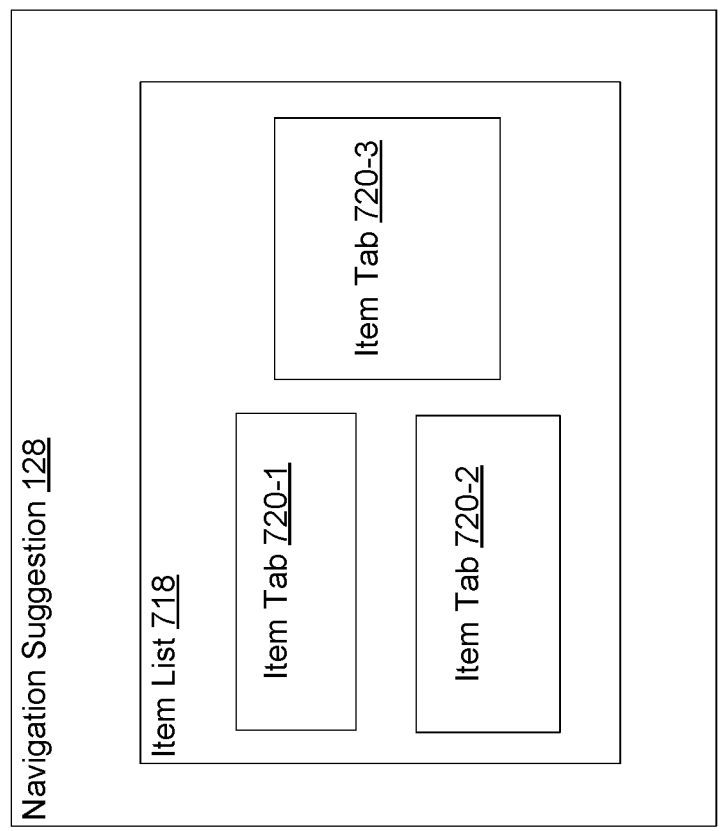
FIG. 7 illustrates an example of a navigation suggestion.

FIG. 7 illustrates an example of the navigation suggestion 128 as an item list 718 having a collection of topically-related item tabs. The item tabs may include a first item tab 720-1, a second item tab 720-2, and a third item tab 720-3. In some implementations, the web pages 121 of the first group 116 may be represented by the item tabs in the item list 718. In some implementations, the web pages 121 of the second group 118 may be represented by the item tabs in the item list 718. In some implementations, a user may select one of the item tabs in the item list 718, which causes the web browser 122 to reload that web page 121 in a particular browser tab 126.

In some implementations, the item list 718 is a collection of items that the user is interested in purchasing, which were tracked and gathered from web pages the user has visited using the web browser 122. For example, the item list 718 may be a UI element that displays products (or services) and/or merchants in a user's consideration set in a manner that allows for easy comparison. Typically, for product comparison, users use multiple browser tabs 126 to make comparisons between products and merchants (e.g., some-times referred to as page parking). In some implementations, similar to the auto-tab list 518, the item list 718 is rendered on the user interface 124 when the web browser 122 enters the tab switcher UI. In some implementations, the item list 718 is rendered on the user interface 124 in the bookmark section of the web browser 122. In some implementations, the display of a particular item tab on the web browser 122 may be associated with a selectable pin that when selected causes the server 102 to track that particular item. In some implementations, the item list 718 is rendered in a strip or list, visible or available from a browser toolbar. For example, users can manually pin pages to the item list 718. In some implementations, the manually pinned pages remain on the item list 718 until removed. In some implementations, manually pinned pages are visually distinguished from automatic items in the item list 718.

Figure 8:
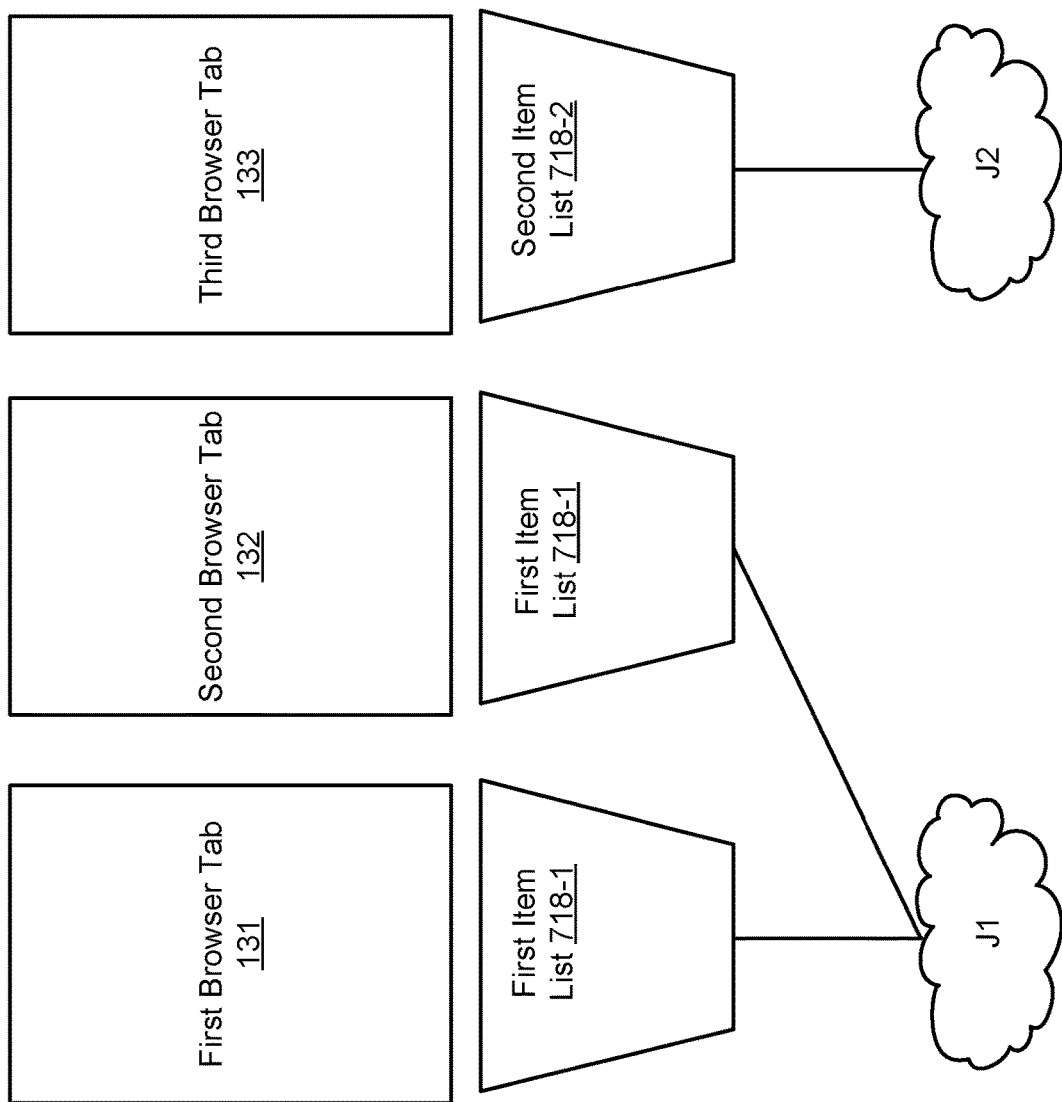
FIG. 8 illustrates a relationship between item lists and groups.

FIG. 8 illustrates a relationship between the item list 718 and groups (or journeys). A first item list 718-1 may be associated with the first group 116 (which relates to a first journey). For example, the first item list 718-1 may include a list of the web pages 121 of the first group 116. In this example, since the first browser tab 131 and the second browser tab 132 are topically related to the first group 116, the first browser tab 131 is associated with the first item list 718-1 and the second browser tab 132 is associated with the first item list 718-1. However, the third browser tab 133 is associated with the second group 118, and the third browser tab 133 is associated with a second item list 718-2 that includes the web pages 121 of the second group 118.

Figure 9:
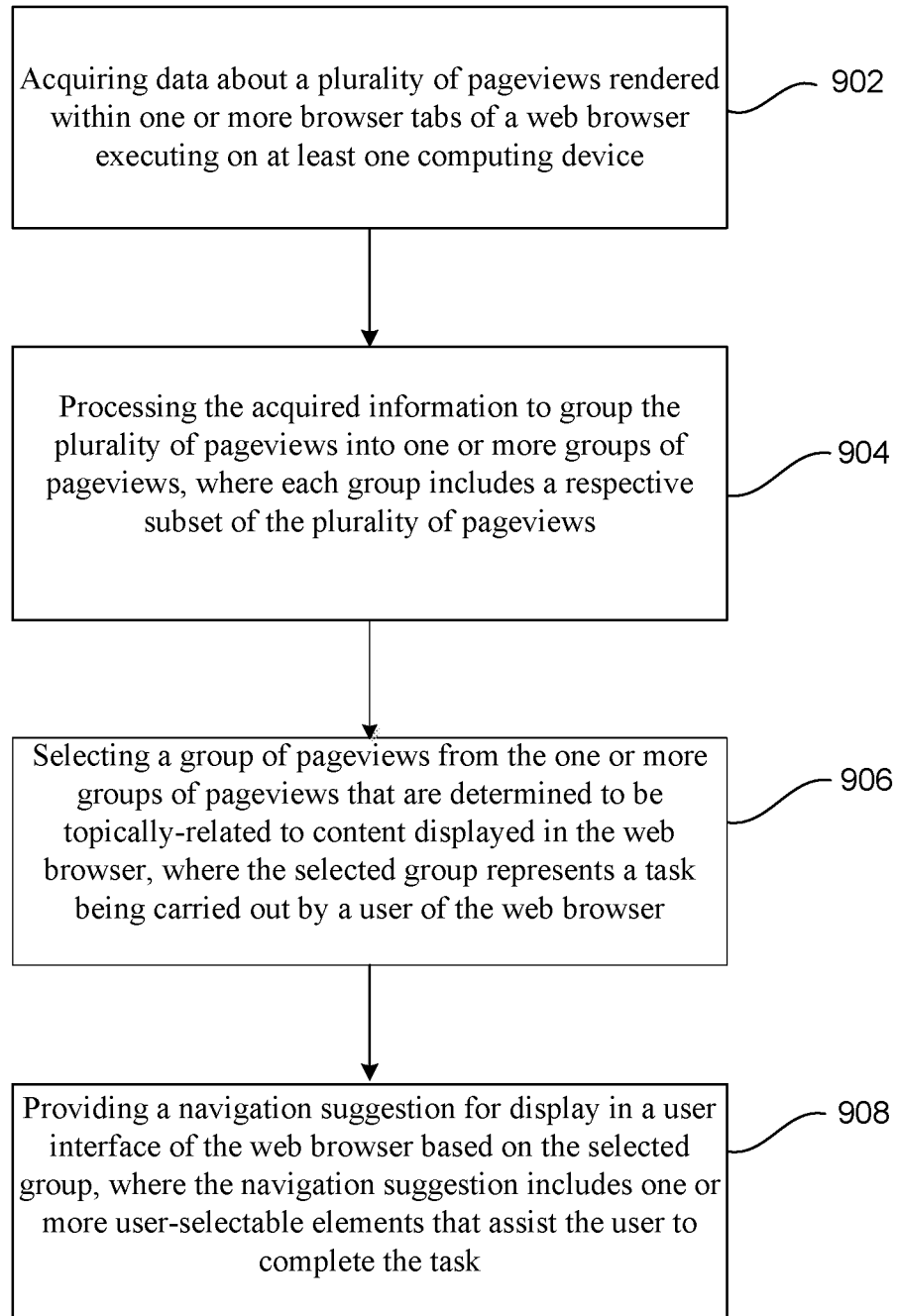
FIG. 9 is a flowchart illustrating example operations of the web browser and/or the server.

FIG. 9 is a flowchart 900 illustrating certain example operations of the server 102 and/or the web browser 122. Although the flowchart 900 of FIG. 9 illustrates the operations in sequential order, it will be appreciated that this is merely an example, and that additional or alternative operations may be included. Further, operations of FIG. 9 and related operations may be executed in a different order than that shown, or in a parallel or overlapping fashion. In some implementations, the operations of FIG. 9 are executed by the server 102. In some implementations, the operations of FIG. 9 are executed by the web browser 122. In some implementations, the operations of FIG. 9 are executed by a combination of the web browser 122 and the server 102.

Operation 902 include acquiring data about a plurality of web pages 121 rendered within one or more browser tabs 126 of a web browser 122 executing on at least one computing device 120. In some implementations, the plurality of web pages 121 includes a first web page rendered by the web browser 122 executing on a first device, and a second web page rendered by the web browser 122 executing on a second device. For example, browser data may be synced across multiple devices associated with the user. In some implementations, the web browser 122 generates the data 101 as the user is using the web browser 122. For example, the user may enter one or more terms in a search box, search filed or search bar, select a bookmark, a page from the browser history, etc. Then, the user may navigate through web pages 121 rendered by browser tabs 126 of the web browser 122. In some implementations, the web browser 122 may transmit at least a portion of the data 101, over the network 130, to the server 102.

Operation 904 includes processing the acquired data to group the plurality of web pages 121 into one or more groups (e.g., the first group 116, the second group 118), where each group includes a respective subset of the plurality of web pages 121. The processing may include performing a similarity analysis using the acquired data 101, where each group includes web pages 121 that are determined to be topically related to each other based on the similarity analysis. In some examples, the similarity analysis includes hierarchical clustering. In some implementations, the web browser 122 is configured to perform a similarity analysis on the various web pages 121 rendered by the web browser 122 in order to identify the group of topically-related web pages 121. In some implementations, the server 102 is configured to perform a similarity analysis on the various web pages 121 rendered by the web browser 122 in order to identify the group of topically-related web pages 121.

In some implementations, the server 102 is configured to generate a plurality of navigation trees 114 based on the data 101, cluster a subset of the plurality of navigation trees 114 into a cluster group based on the similarity analysis, and identify the group of web pages 121 from the cluster group. In some implementations, the navigation tree 114 includes page nodes and links between the page nodes, where the page nodes represent web pages 121 rendered by the web browser 122, and the links represent navigation paths between the web pages 121.

In some implementations, the web browser 122 and/or the server 102 is configured to filter the group of web pages 121 to remove one or more web pages 121 from the group of web pages 121 based on determined values for one or more user engagement metrics, where each determined value of a user engagement metric indicates an amount of user engagement with a respective web page 121 of the group. In some implementations, the web browser 122 and/or the server 102 is configured to sort the group of web pages 121 based on the determined values of one or more user engagement metrics.

Operation 906 includes selecting a group of web pages 121 from the one or more groups of web pages 121 that are determined to be topically-related to content displayed in the web browser 122. In some examples, the server 102 or the web browser 122 performs a similarity analysis with respect to the content displayed in the web browser 122 and the group of web pages 121, and if the content displayed in the web browser 122 has a similarity metric greater than a threshold level with respect to the group of web pages 121, the server 102 or the web browser 122 may determine that the content displayed in the web browser 122 is topically-related to the content of the group of web pages 121. In some examples, this similarity analysis may include any one or more of the operations explained above with respect to the navigation trees 114.

For example, a user may navigation to a tab switcher UI and select a particular browser tab 126 having content that is determined to be topically related the first group 116 of web pages 121, and the first group 116 of web pages 121 may be selected. The selected group may represent a task that is carried out a user of the web browser 122. For example, since the currently-viewed information relates to the first group 116, the system 100 (e.g., the server 102 and/or the web browser 122) may determine that the user is currently carrying out the first task.

Operation 908 includes providing a navigation suggestion 128 for display on a user interface 124 of the web browser 122 based on the selected group, where the navigation suggestion 128 includes one or more user-selectable elements that assist the user to complete the task. In some implementations, the navigation suggestion 128 includes one or more web pages 121 of the selected group. In some implementations, the navigation suggestion 128 includes one or more suggested web pages 121 (e.g., not part of any of the groups). In some implementations, the navigation suggestion 128 includes a sequence of web pages 121 (e.g., previously rendered or suggested), search ideas, and/or other navigation suggestions that provide a course of action for completing the task.

In some implementations, the server 102 and/or the web browser 122 is configured to determine that the group of web pages 121 is topically related to content rendered in a browser tab 126 opened in the web browser 122, and provide the group of web pages 121 for selection in a tab switcher interface of the web browser 122 in a location proximate to the browser tab 126. In some implementations, the server 102 and/or the web browser 122 is configured to provide a selection to the group of web pages 121 in a bookmark section of the web browser 122. In some implementations, the server 102 and/or the web browser 122 is configured to provide a selection to the group of web pages 121 as a navigation suggestion associated with a search box of the web browser 122.

In some implementations, the group of web pages 121 is the first group 116 of web pages 121. In some implementations, the server 102 and/or the web browser 122 is configured to determine the second group 118 of web pages 121 from the plurality of plurality of web pages 121 based on a similarity analysis of the accessed data 101, where the second group 118 of web pages 121 has content topically different than content of the first group 116, and the server 102 and/or the web browser 122 is configured to provide the second group 118 of web pages 121 for selection on the user interface 124 of the web browser 122. In some implementations, the server 102 and/or the web browser 122 is configured to determine that the first group 116 of web pages 121 is topically related to the first browser tab 131 opened on the web browser 122, determine that the second group 118 of web pages 121 is topically related to the second browser tab 132 opened on the web browser 122, provide the first group 116 of web pages 121 for selection in response to a selection of the first browser tab 131, and provide the second group 118 of web pages 121 for selection in response to a selection of the second browser tab 132. In some implementations, the server 102 and/or the web browser 122 is configured to pre-fetch web content for at least one web page 121 of the navigation suggestion 128 independently of a user selection of the at least one web page 121.

Figure 10:
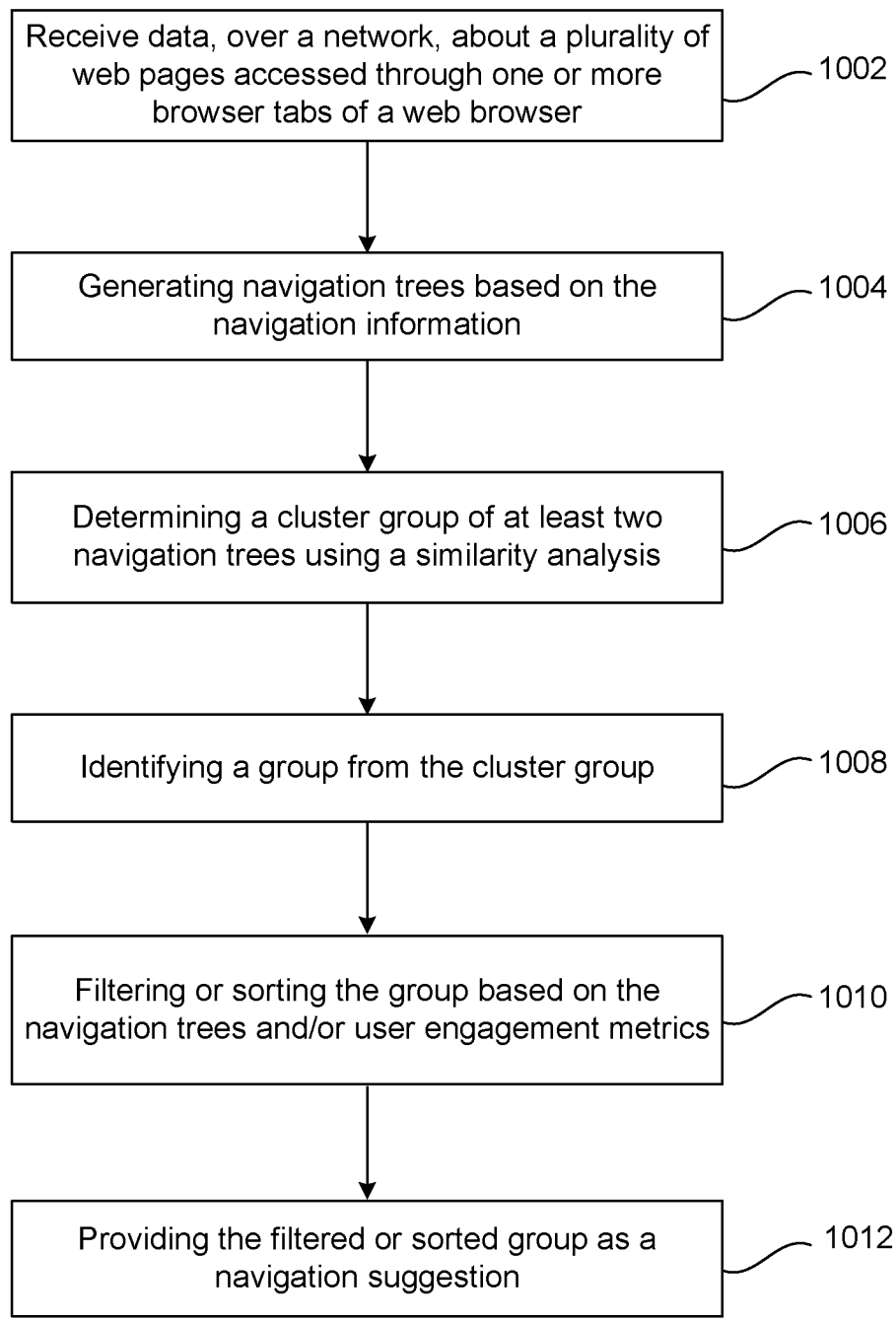
FIG. 10 is a flowchart illustrating example operations of the sync server.

FIG. 10 is a flowchart 1000 illustrating example operations of the server 102. Although the flowchart 1000 of FIG. 10 illustrates the operations in sequential order, it will be appreciated that this is merely an example, and that additional or alternative operations may be included. Further, operations of FIG. 10 and related operations may be executed in a different order than that shown, or in a parallel or overlapping fashion.

Operation 1002 includes receiving data 101, over a network 130, about a plurality of web pages 121 accessed through one or more browser tabs 126 of the web browser 122. For example, the server 102 is configured to receive the data 101 as the user is using the web browser 122.

Operation 1004 includes generating navigation trees 114 based on the data 101. For example, the server 102 is configured to generate the navigation trees 114 using the data 101. For example, when a user starts a search, or activates a link to a bookmark or a page in the browser history, a new navigation tree 114 is generated.

Operation 1006 includes determining a cluster group of at least two navigation trees 114 using a similarity analysis. For example, the server 102 may cluster a subset of the navigation trees 114 into a cluster group using a similarity analysis. For example, the server 102 may represent each navigation tree 114 with keywords and associate a probability with each of the keywords indicating a relative likelihood that a particular keyword represents its navigation tree 114. The server 102 may create a feature vector for each navigation tree 114 using the keywords and probabilities, and determine distance (or similarity) vectors based on comparisons of the feature vectors. If the value of the distance vector is above a threshold level, the server 102 may determine that the corresponding navigation trees 114 are similarly related to the same topic, and include these navigation trees 114 within the cluster group.

Operation 1008 includes identifying a group from the cluster group. For example, the server 102 may identify the web pages 121 for the group as the web pages 121 of the navigation trees 114 of the cluster group.

Operation 1010 includes filtering or sorting the group based on the navigation trees and/or user engagement metrics. For example, the server 102 may filter the group by removing the web pages 121 of intermediate nodes 336 of the navigation trees 114 of the cluster group. The server 102 may filter the group of web pages 121 based on user engagement metrics, where the user engagement metrics indicates an amount of user engagement with each of the web pages 121 of the group. In some implementations, the server 102 may remove one or more web pages 121 from the group based on the user engagement metrics (e.g., thereby including web pages with higher engagements). In some implementations, the server 102 may sort the web pages 121 within the group based on temporal order or the user engagement metrics (e.g., a list may provide the web pages 121 in an order according to user engagement, where the web pages 121 with higher engagements are provided first).

Operation 1012 includes providing the filtered or sorted group as a navigation suggestion. For example, the server 102 may transmit an identification of the filtered or sorted group, over the network 130, to the web browser 122 executing on the computing device 120. In some implementations, the server 102 provides the filtered or sorted group based on user's activity associated with the web browser 122. For example, the user may direct the web browser 122 to a tab switcher interface and select one of the opened browser tabs 126, and, in response to this activity, the server 102 may transmit an identification of the filtered or sorted group. In some implementations, the server 102 may transmit the filtered or sorted group along with location specifying which location of the user interface 124 to render the filtered or sorted group.

Figure 11:
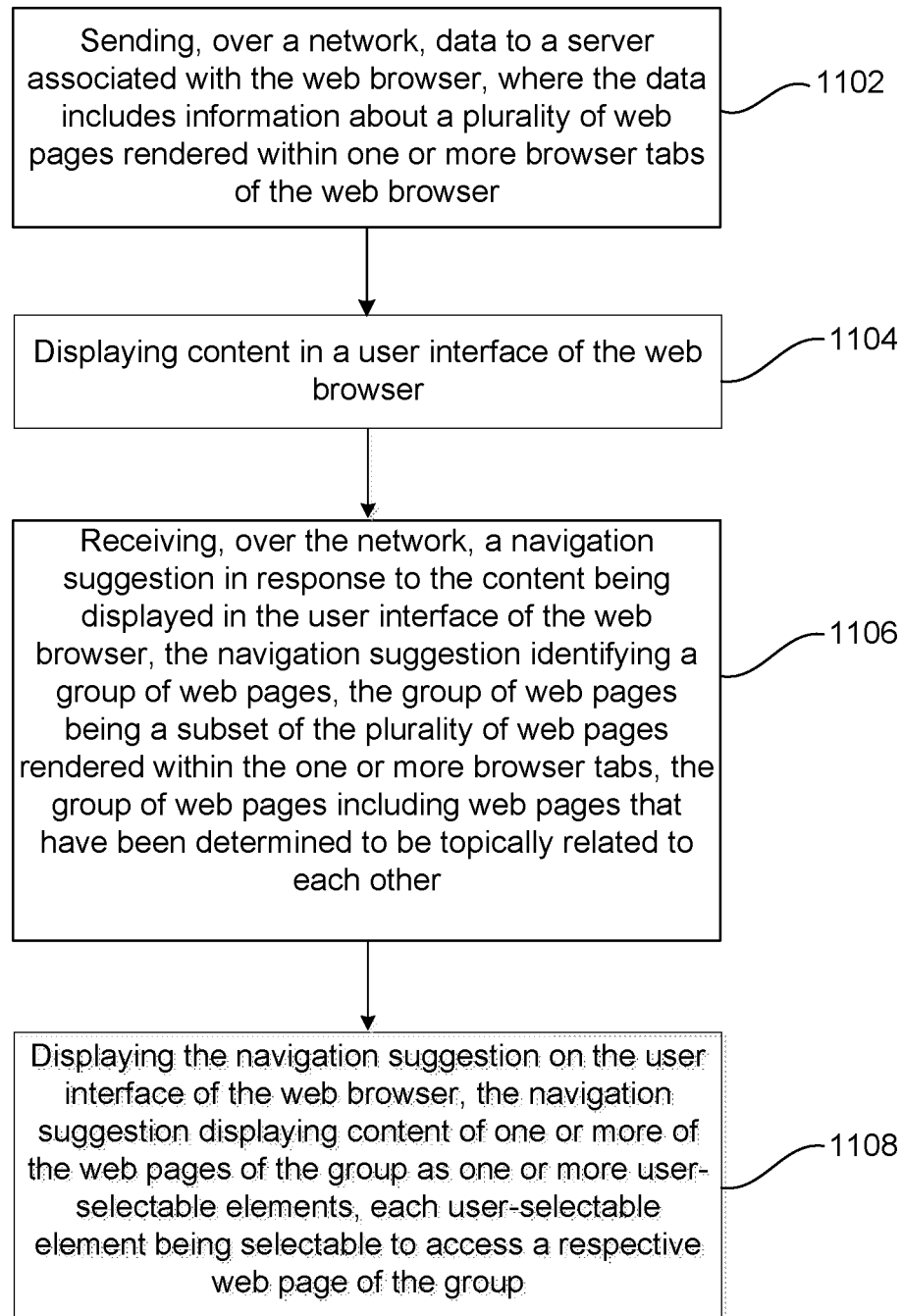
FIG. 11 is a flowchart illustrating example operations of the web browser.

FIG. 11 is a flowchart 1100 illustrating certain example operations of the web browser 122. Although the flowchart 1100 of FIG. 11 illustrates the operations in sequential order, it will be appreciated that this is merely an example, and that additional or alternative operations may be included. Further, operations of FIG. 11 and related operations may be executed in a different order than that shown, or in a parallel or overlapping fashion.

Operation 1102 includes sending, over a network 130, the data 101 to the server 102 associated with the web browser 122, where the data 101 includes information about a plurality of web pages 121 rendered within one or more browser tabs 126 of the web browser 122.

Operation 1104 includes displaying content in a user interface 124 of the web browser 122. For example, the content may be the content that is currently visible to the user.

Operation 1106 includes receiving, over the network 130, a navigation suggestion 128 in response to the content being displayed in the user interface 124 of the web browser 122, where the navigation suggestion 128 identifies a group (e.g., the group 116 or the group 118) of web pages 121, and the group of web pages 121 are a subset of the plurality of web pages 121 rendered by the web browser 122. The group of web pages 121 including web pages that have been topically related to each other and to the content displayed in the user interface 124.

Operation 1108 includes displaying the navigation suggestion 128 on the user interface 124 of the web browser 122, where the navigation suggestion 128 displays content of one or more of the web pages 121 of the group as one or more user-selectable elements, and each user-selectable element is selectable to access a respective web page 121 of the group.

In some implementations, the web browser 122 may pre-fetch web content for at least one web page 121 of the group of web pages 121 in advance of a user selection of the at least one web page 121. In some implementations, the navigation suggestion 128 displays the list of web pages 121 of the group in chronological order. In some implementations, the group of web pages 121 are topically related to content displayed in a browser tab 126 opened on the web browser 122, and the web browser 122 is configured to display the list of the web pages 121 of the group in a tab switcher interface of the web browser 122 in response to a user selection of the browser tab 126 within the tab switcher interface.

In some implementations, the group of web pages is the first group 116 of web pages 121, and the web browser 122 configured to receive, over the network 130, identification of the second group 118 of web pages 121 from the server 102, where the second group 118 of web pages 121 has content topically different than content of the first group 116 of web pages 121. The first group 116 of web pages 121 is topically related to the first browser tab 131 opened on the web browser 122, and the second group 118 of web pages 121 is topically related to the second browser tab 132 opened on the web browser 122. The web browser 122 may display the first browser tab 131 and the second browser tab 132 for selection in a tab switcher interface of the web browser 122, display a list of web pages 121 of the first group 116 in the tab switcher interface in response to a user selection of the first browser tab 131 within the tab switcher interface, and display a list of web pages 121 of the second group 118 in the tab switcher interface in response to a user selection of the second browser tab 132 within the tab switcher interface.

In some implementations, the web browser 122 is configured to display the link to the group on the user interface 124 of the web browser 122, and display the list of the web pages 121 of the group in response to a user selection of the link. In some implementations, the web browser 122 is configured to display the link to the group in a bookmark section of the web browser 122. In some implementations, the web browser 122 is configured to display the link to the group as a navigation suggestion in response to one or more search terms being entered in a search box of the web browser 122.

Figures 12H, 12I, 12J:
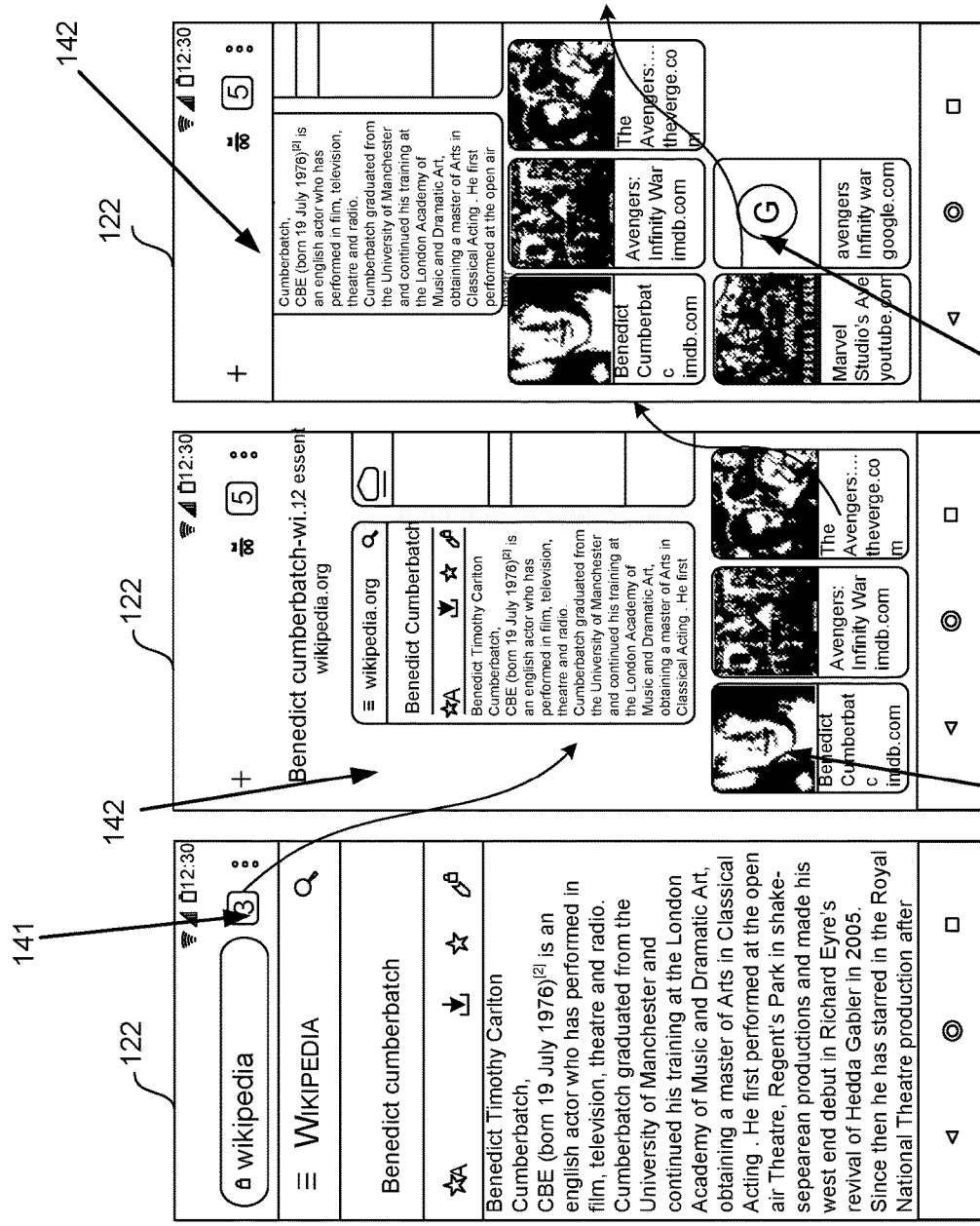
FIG. 12H illustrates a screenshot of the web browser.
FIG. 12I illustrates a screenshot of the web browser.
FIG. 12J illustrates a screenshot of the web browser.
Figure 12K:
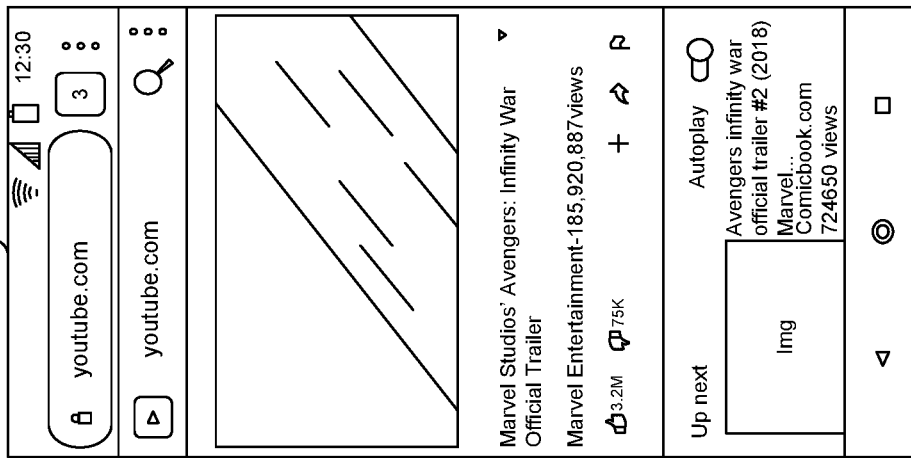
FIG. 12K illustrates a screenshot of the web browser.

FIGS. 12A through 12K illustrate example screenshots of the web browser 122 configured to display the first group 116 as the auto-tab list 518. The example screenshots depict a browsing session using the web browser 122 where a user is carrying out a task, e.g., deciding to see the new Avengers movie. FIG. 12A shows a screenshot of an Internet search conducted with search terms—avengers: infinity war. Then, the user looked at a trailer of the movie (see screenshot in FIG. 12B), an article about the movie (see screenshot in FIG. 12C), and the cast of the movie (see screenshot in FIG. 12D) using the web browser 122. Then, FIGS. 12E, 12F, 12G, and 12H are screenshots illustrating the user's curiosity about one of the actors, and searches for Benedict Cumberbatch. After reading about Cumberbatch (see screenshot in FIG. 12H), the user has decided to see the movie, but now the user decides he wants to convince one of his friends to come, and wants to locate the trailer.

Upon selecting a link 141, the web browser 122 displays the tab switcher UI 142 as shown in FIG. 12I. The tab switcher UI 142 provides a horizontal carousal to switch to other browser tabs in the user's working set, as shown in FIG. 12I. With respect to the selected tab in the tab switcher UI 142, the web browser 122 provides the auto-tab list 518 that identifies a collection of topically-related web page 121, which are topically related to the selected browser tab, as shown by the screenshots of FIGS. 121 and 12J. The auto-tab list 518 includes the Avenger's trailer, which the user can click to load the page (see screenshot in FIG. 12K), and share with another user.

Figures 13A, 13B:
FIG. 13A illustrates a screenshot of the web browser.
FIG. 13B illustrates a screenshot of the web browser.
Figures 13C, 13D, 13E:
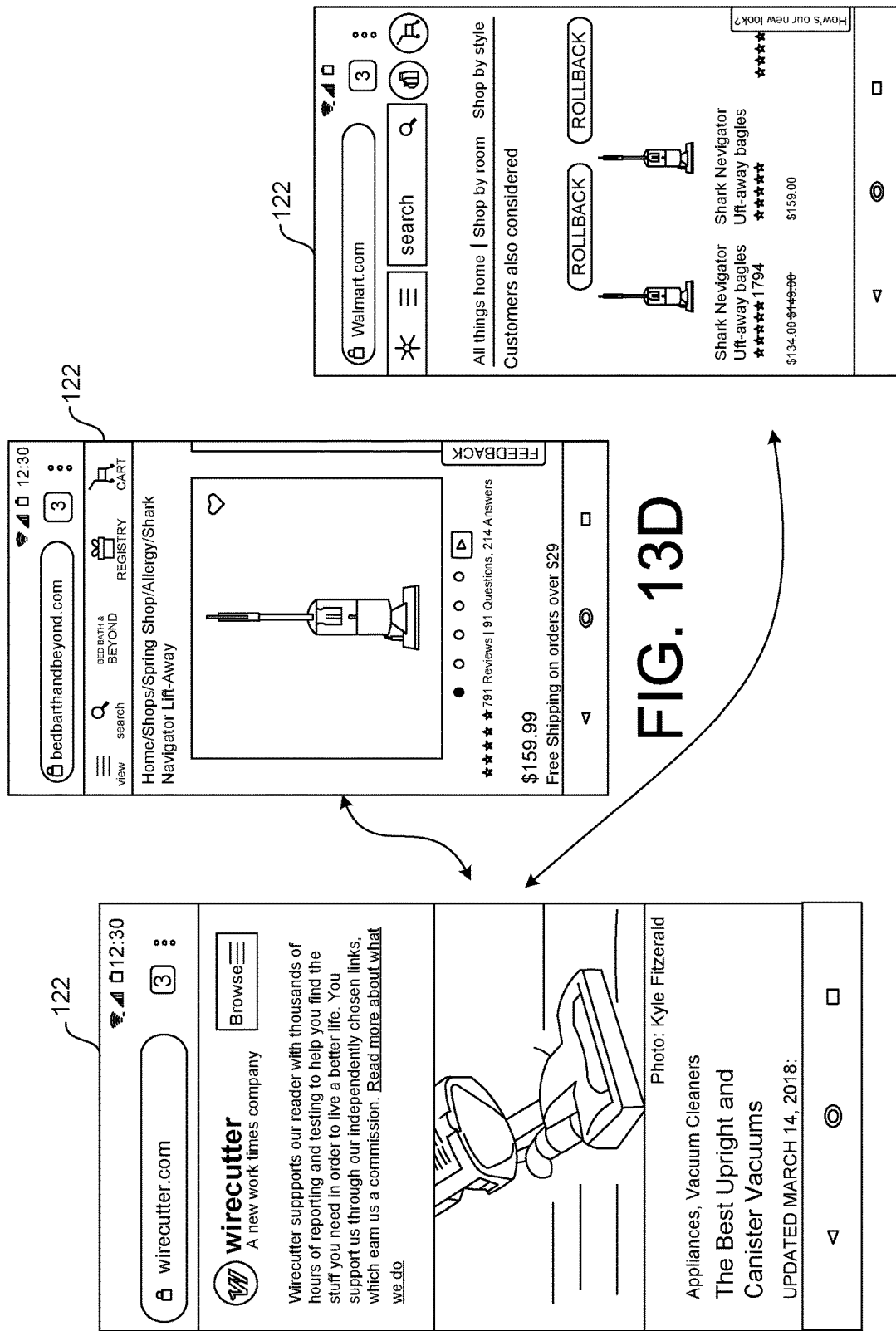
FIG. 13C illustrates a screenshot of the web browser.
FIG. 13D illustrates a screenshot of the web browser.
FIG. 13E illustrates a screenshot of the web browser.
Figures 13F, 13G:
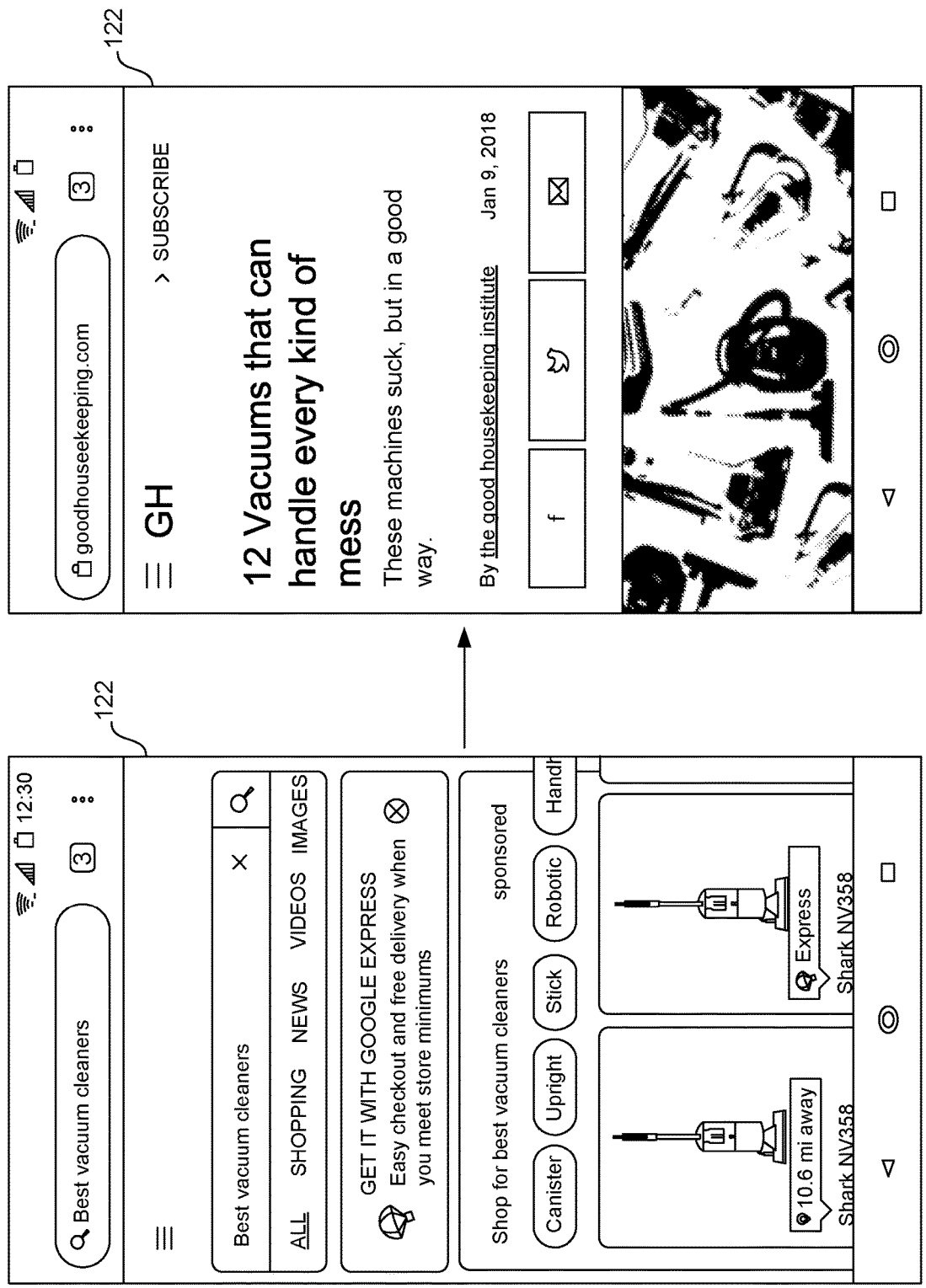
FIG. 13F illustrates a screenshot of the web browser.
FIG. 13G illustrates a screenshot of the web browser.
Figure 13J:
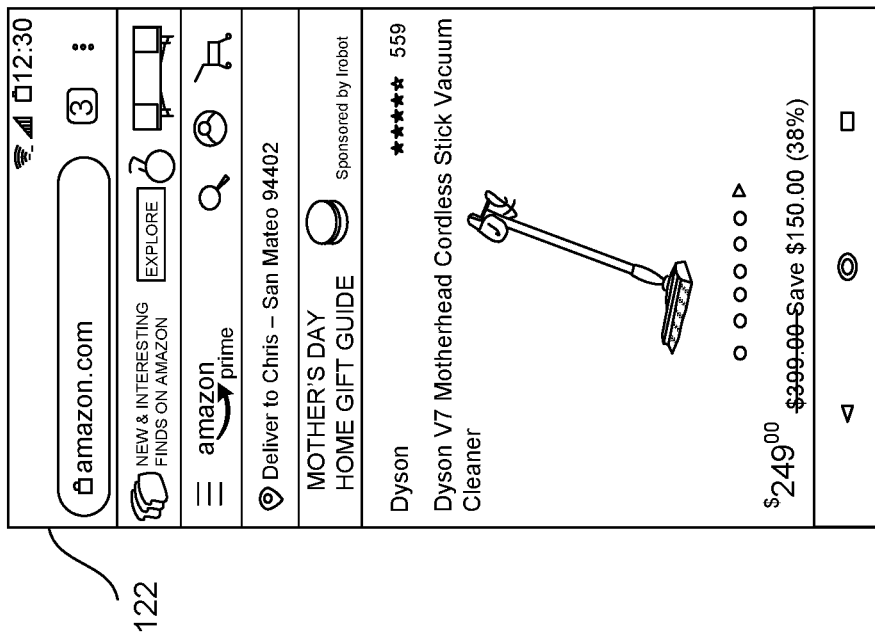
FIG. 13J illustrates a screenshot of the web browser.

FIGS. 13A through 13M illustrate example screenshots of the web browser 122 configured to display the first group 118 as the item list 718. The example screenshots depict a browsing session using the web browser 122 where a user is carrying out a task, e.g., purchasing a new vacuum cleaner. FIGS. 13A and 13B are screenshots showing the user using the web browser 122 to load and view a review site. FIGS. 13C, 13D, 13E are screenshots showing the user locating two potential items. The user would like to validate these options and find additional options, so the user searches for other reviews, as shown in FIGS. 13F and 13G. From the review in the screenshot of FIG. 13H, the user locates two other items, as shown in the screenshots of FIGS. 13I and 13J. As shown in the screenshots of FIGS. 13K, 13L, and 13M, the web browser 122 identifies the item list 718 that includes the items that the user has viewed. For example, as shown in the screenshot of FIG. 13K, the web browser 122 displays the tab switcher UI 142, and the web browser 122 provides the item list 718 with respect to the selected browser tab. In some implementations, as shown in the screenshot of FIG. 13K, the web browser 122 also displays the auto-tab list 518 associated with the selected browser tab. Upon the selection of a link 160, the web browser 122 displays the auto-tab list 518 with the full list of items (in this example, the number of items is 4), as shown in in the screenshot of FIG. 13L. Also, in some implementations, the user can manually pin items to the item list 718. For example, as shown in the screenshot of FIG. 13M, the item list 718 also includes the manually pinned items, which is distinguished from the other items by displaying an icon 162 associated with the manually pinned item.

FIG. 14 illustrates an example screenshot of the navigation suggestion 128 that displays the first group 116 as a page (e.g., also referred to as a journey page). As shown in FIG. 14, the journey page depicts the web pages of the first group 116 in chronological order, separated by the days in which the web pages 121 were rendered. The journey page also includes a title (e.g., Seattle Hiking) which is the title of the first group 116. In some implementations, the navigation suggestion 128 also displays the top web pages 167 of the first group 116 (e.g., selected by user engagement metrics).

FIG. 15 illustrates an example screenshot of the web browser 122. In some implementations, the web browser 122 may provide a navigation suggestion 171 to the first group 116 when the user is typing one or more search terms into a search box 170 of the web browser 122. For example, in response to the one or more search terms being determined as relevant to the first group 116, the web browser 122 may display the navigation suggestion 171 to the first group 116. Upon selection of the navigation suggestion 171, the web browser 122 may display the list of the web pages 121 of the first group 116, as shown in FIG. 14.

Figure 16:
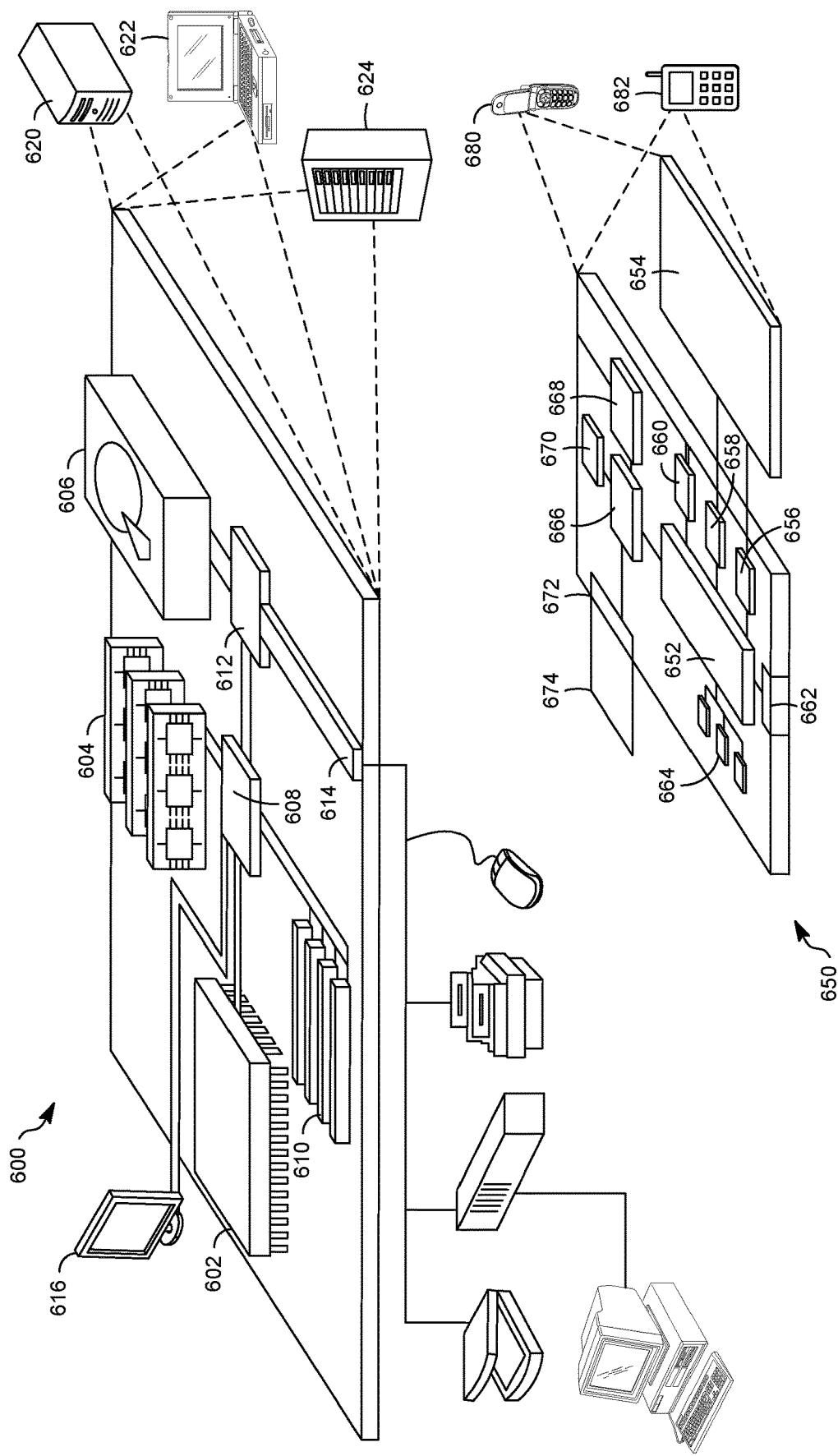
FIG. 16 shows an example of a computer device and a mobile computer device.

FIG. 16 shows an example of a computer device 600 and a mobile computer device 650, which may be used with the techniques described here. In some implementations, the computer device 600 is an example of the computing device 120. In some implementations, the computer device 600 is an example of the server 102. In some implementations, the mobile computer device 650 is an example of the computing device 120. Computing device 600 is intended to represent various forms of digital computers, such as laptops, desktops, tablets, workstations, personal digital assistants, televisions, servers, blade servers, mainframes, and other appropriate computing devices. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low-speed interface 612 connecting to low-speed bus 614 and storage device 606. The processor 602 can be a semiconductor-based processor. The memory 604 can be a semiconductor-based memory. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high-speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high-speed controller 608 manages bandwidth-intensive operations for the computing device 600, while the low-speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652 that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, Wi-Fi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smart phone 682, personal digital assistant, or another similar mobile device.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In this specification and the appended claims, the singular forms "a," "an" and "the" do not exclude the plural reference unless the context clearly dictates otherwise. Further, conjunctions such as "and," "or," and "and/or" are inclusive unless the context clearly dictates otherwise. For example, "A and/or B" includes A alone, B alone, and A with B. Further, connecting lines or connectors shown in the various figures presented are intended to represent exemplary functional relationships and/or physical or logical couplings between the various elements. Many alternative or additional functional relationships, physical connections or logical connections may be present in a practical device. Moreover, no item or component is essential to the practice of the embodiments disclosed herein unless the element is specifically described as "essential" or "critical".

Terms such as, but not limited to, approximately, substantially, generally, etc., are used herein to indicate that a precise value or range thereof is not required and need not be specified. As used herein, the terms discussed above will have ready and instant meaning to one of ordinary skill in the art.

Moreover, use of terms such as up, down, top, bottom, side, end, front, back, etc., herein are used with reference to a currently considered or illustrated orientation. If they are considered with respect to another orientation, it should be understood that such terms must be correspondingly modified.

Further, in this specification and the appended claims, the singular forms "a," "an" and "the" do not exclude the plural reference unless the context clearly dictates otherwise. Moreover, conjunctions such as "and," "or," and "and/or" are inclusive unless the context clearly dictates otherwise. For example, "A and/or B" includes A alone, B alone, and A with B.

Although certain example methods, apparatuses and articles of manufacture have been described herein, the scope of coverage of this patent is not limited thereto. It is to be understood that terminology employed herein is for the purpose of describing particular aspects, and is not intended to be limiting. On the contrary, this patent covers all methods, apparatus and articles of manufacture fairly falling within the scope of the claims of this patent.

What is claimed is:

1. A method comprising:
   generating browsing data about open browser tabs on a mobile user device;
   identifying a first set of tabs and a second set of tabs among the open browser tabs based on a similarity analysis of the browsing data, wherein a first open browser tab of the open browser tabs is related to the first set of tabs and a second open browser tab of the open browser tabs is related to the second set of tabs;
   rendering a tab switcher interface on the mobile user device, the tab switcher interface including an auto-tab list of a collection of topically related web pages and a horizontal carousel configured to scroll through the open browser tabs, the horizontal carousel having a first visual item, rendered in a foreground of the tab switcher interface, representing the first open browser tab, and a second visual item representing the second open browser tab, the auto-tab list displayed below the horizontal carousel and adjacent to the first visual item;
   rendering at least a portion of the first set of tabs in the auto-tab list; and
   in response to a user gesture that positions the second visual item in the foreground of the tab switcher interface proximate to the auto-tab list, rendering at least a portion of the second set of tabs in the auto-tab list.

2. The method of claim 1, further comprising:
   generating a ranked list of web pages displayed in tabs of the first set of tabs based on user engagement metrics associated with the web pages; and
   displaying the tabs of the first set of tabs according to the ranked list.

3. The method of claim 1, wherein identifying the first set of tabs includes:
   forming a group of open browser tabs having web pages that are semantically related to each other, the first set of tabs including the first open browser tab and the second open browser tab;
   determining that a user engagement metric of the second open browser tab does not achieve a threshold level; and
   not including the second open browser tab in the first set of tabs.

4. The method of claim 1, further comprising:
   in response to a user selection of the second visual item in the tab switcher interface, rendering the second open browser tab on a display of the mobile user device.

5. The method of claim 1, further comprising:
   generating at least one navigation graph based on the browsing data, the at least one navigation graph including nodes and at least one link between the nodes, the nodes representing web pages rendered within the open browser tabs, the at least one link representing a navigation path between the web pages; and
   identifying the first set of tabs and the second set of tabs using the at least one navigation graph.

6. The method of claim 1, wherein the first visual item and the second visual item in the tab switcher interface include thumbnail representations of the first open browser tab and the second open browser tab respectively.

7. A non-transitory computer-readable medium storing executable instructions that when executed by at least one processor cause the at least one processor to execute operations, the operations comprising:
   generating browsing data about open browser tabs on a mobile user device;
   identifying a first set of tabs and a second set of tabs among the open browser tabs based on a similarity analysis of the browsing data, wherein a first open browser tab of the open browser tabs is related to the first set of tabs and a second open browser tab of the open browser tabs is related to the second set of tabs;
   rendering a tab switcher interface on the mobile user device, the tab switcher interface including an auto-tab list of a collection of topically related web pages and a horizontal carousel configured to scroll through the open browser tabs, the horizontal carousel having a first visual item, rendered in a foreground of the tab switcher interface, representing the first open browser tab, and a second visual item representing the second open browser tab, the auto-tab list displayed below the horizontal carousel and adjacent to the first visual item;
   rendering at least a portion of the first set of tabs in the auto-tab list; and
   in response to a user gesture that positions the second visual item in the foreground of the tab switcher interface proximate to the auto-tab list, rendering at least a portion of the second set of tabs in the auto-tab list.

8. The non-transitory computer-readable medium of claim 7, wherein the operations comprise:

generating a ranked list of web pages displayed in tabs of the first set of tabs based on user engagement metrics associated with the web pages; and displaying the tabs of the first set of tabs according to the ranked list.

9. The non-transitory computer-readable medium of claim 7, wherein the operations comprise:

forming a group of open browser tabs that have web pages that are semantically related to each other, the first set of tabs including the first open browser tab and the second open browser tab;

determining that a user engagement metric of the second open browser tab does not achieve a threshold level; and not including the second open browser tab in the first set of tabs.

10. The non-transitory computer-readable medium of claim 7, wherein the operations comprise:

in response to a user selection of the second visual item in the tab switcher interface, rendering the second open browser tab on a display of the mobile user device.

11. The non-transitory computer-readable medium of claim 7, wherein the operations comprise:

generating at least one navigation graph based on the browsing data, the at least one navigation graph including nodes and at least one link between the nodes, the nodes representing web pages rendered within the open browser tabs, the at least one link representing a navigation path between the web pages; and identifying the first set of tabs and the second set of tabs using the at least one navigation graph.

12. A computing system comprising:

at least one processor; and a non-transitory computer-readable medium storing executable instructions that cause the at least one processor to execute operations, the operations comprising:

generating browsing data about open browser tabs on a mobile user device;

identifying a first set of tabs and a second set of tabs among the open browser tabs based on a similarity analysis of the browsing data, wherein a first open browser tab of the open browser tabs is related to the first set of tabs and a second open browser tab of the open browser tabs is related to the second set of tabs;

rendering a tab switcher interface on the mobile user device, the tab switcher interface including an auto-tab list of a collection of topically related web pages and a horizontal carousel configured to scroll through the open browser tabs, the horizontal carousel having a first visual item, rendered in a foreground of the tab switcher interface, representing the first open browser tab, and a second visual item representing the second open browser tab, the auto-tab list displayed below the horizontal carousel and adjacent to the first visual item;

rendering at least a portion of the first set of tabs in the auto-tab list; and in response to a user gesture that positions the second visual item in the foreground of the tab switcher interface proximate to the auto-tab list, rendering at least a portion of the second set of tabs in the auto-tab list.

13. The computing system of claim 12, wherein the operations further comprise:

generating a ranked list of web pages displayed in tabs of the first set of tabs based on user engagement metrics associated with the web pages; and displaying the tabs of the first set of tabs according to the ranked list.

14. The computing system of claim 12, wherein the operations further comprise:

forming a group of open browser tabs that have web pages that are semantically related to each other, the first set of tabs including the first open browser tab and the second open browser tab;

determining that a user engagement metric of the second open browser tab does not achieve a threshold level; and not including the second open browser tab in the first set of tabs.

15. The computing system of claim 12, wherein the operations further comprise:

in response to a user gesture on the second visual item in the tab switcher interface, rendering the second open browser tab on a display of the mobile user device.

16. The computing system of claim 12, wherein the operations further comprise:

generating a first navigation graph and a second navigation graph based on the browsing data, the first navigation graph being associated with a first feature vector having one or more keywords about web pages of the first navigation graph, the second navigation graph being associated with a second feature vector having one or more keywords about web pages of the second navigation graph;

grouping the first navigation graph and the second navigation graph into a cluster group based on a similarity distance between the first feature vector and the second feature vector; and identifying, from the cluster group, the first set of tabs and the second set of tabs.

* * * * *